United States Patent
Endle et al.

(10) Patent No.: US 7,981,499 B2
(45) Date of Patent: *Jul. 19, 2011

(54) METHODS OF FORMING SHEETING WITH A COMPOSITE IMAGE THAT FLOATS AND SHEETING WITH A COMPOSITE IMAGE THAT FLOATS

(75) Inventors: James P. Endle, Austin, TX (US);
Robert T. Krasa, Hudson, WI (US);
William V. Dower, Austin, TX (US);
Michael W. Dolezal, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1487 days.

This patent is subject to a terminal disclaimer.

(21) Appl. No.: 11/248,950

(22) Filed: Oct. 11, 2005

(65) Prior Publication Data
US 2007/0081254 A1 Apr. 12, 2007

(51) Int. Cl.
*B41M 5/00* (2006.01)
*B44C 1/17* (2006.01)
*G03G 7/00* (2006.01)

(52) U.S. Cl. ............... 428/195.1; 428/207; 428/916; 359/619; 359/620; 359/621; 359/622

(58) Field of Classification Search .......... 359/619–622, 359/626; 428/195.1, 207, 916
See application file for complete search history.

(56) References Cited

U.S. PATENT DOCUMENTS

| | | |
|---|---|---|
| 1,905,716 A | 4/1933 | Ives |
| 1,918,705 A | 7/1933 | Ives |
| 2,039,648 A | 5/1936 | Ives |
| 2,063,985 A | 12/1936 | Coffey |
| 2,279,825 A | 4/1942 | Kaszab |
| 2,326,634 A | 8/1943 | Gebhard et al. |
| 2,500,511 A | 3/1950 | Bonnet |
| 2,622,472 A | 12/1952 | Bonnet |
| 2,833,176 A | 5/1958 | Ossoinak |
| 3,154,872 A | 11/1964 | Nordgren |
| 3,161,509 A | 12/1964 | Howe et al. |
| 3,306,974 A | 2/1967 | Cunnally |
| 3,357,770 A | 12/1967 | Clay |
| 3,365,350 A | 1/1968 | Cahn |
| 3,442,569 A | 5/1969 | Bonnet |
| 3,459,111 A | 8/1969 | Cooper, Jr. |
| 3,503,315 A | 3/1970 | Montebello |
| 3,530,779 A | 9/1970 | Alofs |
| 3,584,369 A | 6/1971 | Montebello |
| 3,607,273 A | 9/1971 | Kinney |
| 3,613,539 A | 10/1971 | Dudley |
| 3,671,122 A | 6/1972 | Dudley |
| 3,676,130 A | 7/1972 | Burckhardt et al. |
| 3,683,773 A | 8/1972 | Dudley |
| 3,706,486 A | 12/1972 | de Montebello |
| 3,751,258 A | 8/1973 | Howe et al. |
| 3,801,183 A | 4/1974 | Sevelin et al. |
| 4,034,555 A | 7/1977 | Rosenthal |
| 4,082,426 A | 4/1978 | Brown |
| 4,099,838 A | 7/1978 | Cook et al. |
| 4,121,011 A | 10/1978 | Glover et al. |
| 4,200,875 A | 4/1980 | Galanos |
| 4,315,665 A | 2/1982 | Haines |
| 4,420,527 A | 12/1983 | Conley |
| 4,424,990 A | 1/1984 | White et al. |
| 4,541,727 A | 9/1985 | Rosenthal |
| 4,541,830 A | 9/1985 | Hotta et al. |
| 4,552,442 A | 11/1985 | Street |
| 4,557,590 A | 12/1985 | Winnek |
| 4,618,552 A | 10/1986 | Tanaka et al. |
| 4,629,667 A | 12/1986 | Kistner et al. |
| 4,632,895 A | 12/1986 | Patel et al. |
| 4,634,220 A | 1/1987 | Hockert et al. |
| 4,650,283 A | 3/1987 | Orensteen et al. |
| 4,668,063 A | 5/1987 | Street |
| 4,688,894 A | 8/1987 | Hockert |
| 4,691,993 A | 9/1987 | Porter et al. |
| 4,694,993 A | 9/1987 | Endo et al. |
| 4,700,207 A | 10/1987 | Vanier et al. |
| 4,708,920 A | 11/1987 | Orensteen et al. |
| 4,714,656 A | 12/1987 | Bradshaw et al. |
| 4,732,453 A | 3/1988 | de Montebello et al. |
| 4,743,526 A | 5/1988 | Ando et al. |
| 4,757,350 A | 7/1988 | Street |
| 4,765,656 A | 8/1988 | Becker et al. |
| 4,772,582 A | 9/1988 | DeBoer |
| 4,775,219 A | 10/1988 | Appeldorn et al. |
| 4,783,141 A | 11/1988 | Baba et al. |
| 4,799,739 A | 1/1989 | Newswanger |
| 4,833,124 A | 5/1989 | Lum |
| 4,876,235 A | 10/1989 | DeBoer |

(Continued)

FOREIGN PATENT DOCUMENTS

| | | |
|---|---|---|
| DE | 198 04 997 C1 | 2/1999 |
| EP | 0 175 504 | 3/1986 |
| EP | 0203752 B1 | 5/1986 |
| EP | 0 363 919 | 1/1990 |
| EP | 0 404 004 | 12/1990 |
| EP | 0 583 766 | 2/1994 |
| EP | 0 658 443 | 6/1995 |
| EP | 0 673 785 | 9/1995 |
| EP | 0 743 552 | 11/1996 |
| EP | 0 688 351 | 8/1997 |

(Continued)

OTHER PUBLICATIONS

De Montebello, "Processing and Display of Three-Dimensional Data II", Proceedings of SPIE, vol. 507, San Diego, 1984.

Y.A. Dudnikov and B.K. Rozhkov, "Raster systems for producing of three-dimensional images," Leningrad, Maschinostroeniye, 1986, pp. 119-123.

(Continued)

*Primary Examiner* — Betelhem Shewareged

(57) ABSTRACT

Microlens sheetings with composite images are disclosed, in which the composite image floats above or below the sheeting, or both. The composite image may be two-dimensional or three-dimensional. Methods for providing such an imaged sheeting are also disclosed.

30 Claims, 12 Drawing Sheets

U.S. PATENT DOCUMENTS

| | | | |
|---|---|---|---|
| 4,892,336 A | 1/1990 | Kaule et al. |
| 4,920,039 A | 4/1990 | Fotland et al. |
| 4,927,238 A | 5/1990 | Green et al. |
| 4,935,335 A | 6/1990 | Fotland |
| 5,064,272 A | 11/1991 | Bailey et al. |
| 5,091,483 A | 2/1992 | Mazurek et al. |
| 5,105,206 A | 4/1992 | Sarraf et al. |
| 5,169,707 A | 12/1992 | Faykish et al. |
| 5,244,288 A | 9/1993 | Nagaoka et al. |
| 5,254,390 A | 10/1993 | Lu |
| 5,264,278 A | 11/1993 | Mazurek et al. |
| 5,279,912 A | 1/1994 | Telfer et al. |
| 5,308,737 A | 5/1994 | Bills et al. |
| 5,326,619 A | 7/1994 | Dower et al. |
| 5,330,799 A | 7/1994 | Sandor et al. |
| 5,359,454 A | 10/1994 | Steenblik et al. |
| 5,360,694 A | 11/1994 | Thien et al. |
| 5,364,740 A | 11/1994 | Fohrenkamm et al. |
| 5,449,597 A | 9/1995 | Sawyer |
| 5,455,689 A | 10/1995 | Taylor et al. |
| 5,459,016 A | 10/1995 | Debe et al. |
| 5,491,045 A | 2/1996 | DeBoer et al. |
| 5,506,300 A | 4/1996 | Ward et al. |
| 5,514,730 A | 5/1996 | Mazurek et al. |
| 5,521,035 A | 5/1996 | Wolk et al. |
| 5,554,432 A | 9/1996 | Sandor et al. |
| 5,589,246 A | 12/1996 | Calhoun et al. |
| 5,594,841 A | 1/1997 | Schutz |
| 5,639,580 A | 6/1997 | Morton |
| 5,642,226 A | 6/1997 | Rosenthal |
| 5,644,431 A | 7/1997 | Magee |
| 5,671,089 A | 9/1997 | Allio |
| 5,680,171 A | 10/1997 | Lo et al. |
| 5,681,676 A | 10/1997 | Telfer et al. |
| 5,685,939 A | 11/1997 | Wolk et al. |
| 5,689,372 A | 11/1997 | Morton |
| 5,706,133 A | 1/1998 | Orensteen et al. |
| 5,712,731 A | 1/1998 | Drinkwater et al. |
| 5,717,844 A | 2/1998 | Lo et al. |
| 5,744,291 A | 4/1998 | Ip |
| 5,757,550 A | 5/1998 | Gulick, Jr. |
| 5,843,617 A | 12/1998 | Patel et al. |
| 5,850,278 A | 12/1998 | Lo et al. |
| 5,850,580 A | 12/1998 | Taguchi et al. |
| 5,856,061 A | 1/1999 | Patel et al. |
| 5,889,118 A | 3/1999 | Delgado et al. |
| 5,894,069 A | 4/1999 | Wen et al. |
| 5,896,230 A | 4/1999 | Goggins |
| 5,935,758 A | 8/1999 | Patel et al. |
| 5,945,249 A | 8/1999 | Patel et al. |
| 5,994,026 A | 11/1999 | DeBoer et al. |
| 6,028,621 A | 2/2000 | Yakubovich |
| 6,057,067 A | 5/2000 | Isberg et al. |
| 6,084,713 A | 7/2000 | Rosenthal |
| 6,092,465 A | 7/2000 | Agronin |
| 6,095,566 A | 8/2000 | Yamamoto et al. |
| 6,110,645 A | 8/2000 | DeBoer et al. |
| 6,177,217 B1 | 1/2001 | Agostinelli et al. |
| 6,197,474 B1 | 3/2001 | Niemeyer et al. |
| 6,212,805 B1 | 4/2001 | Hill |
| 6,228,555 B1 | 5/2001 | Hoffend, Jr. et al. |
| 6,242,152 B1 | 6/2001 | Staral et al. |
| 6,286,873 B1 | 9/2001 | Seder |
| 6,288,842 B1 | 9/2001 | Florczak et al. |
| 6,291,143 B1 | 9/2001 | Patel et al. |
| 6,369,844 B1 | 4/2002 | Neumann et al. |
| 6,388,043 B1 | 5/2002 | Langer et al. |
| 6,468,715 B2 | 10/2002 | Hoffend, Jr. et al. |
| 6,781,733 B1 | 8/2004 | Hira |
| 6,791,723 B1 | 9/2004 | Vallmajo et al. |
| 6,919,892 B1 | 7/2005 | Cheiky et al. |
| 7,068,434 B2 | 6/2006 | Florczak et al. |
| 7,253,958 B2 | 8/2007 | Aizenberg et al. |
| 7,336,422 B2 * | 2/2008 | Dunn et al. ............ 359/626 |
| 7,586,685 B2 | 9/2009 | Dunn et al. |
| 2002/0054434 A1 | 5/2002 | Florczak et al. |
| 2002/0126396 A1 | 9/2002 | Dolgoff |
| 2002/0145807 A1 | 10/2002 | Nishikawa |
| 2003/0116630 A1 | 6/2003 | Carey et al. |
| 2004/0038822 A1 | 2/2004 | Tutt et al. |
| 2005/0057812 A1 | 3/2005 | Raber |
| 2006/0262411 A1 | 11/2006 | Dunn et al. |
| 2007/0081254 A1* | 4/2007 | Endle et al. ............ 359/626 |
| 2008/0023890 A1 | 1/2008 | Sherman et al. |
| 2008/0027199 A1 | 1/2008 | Mazurek et al. |
| 2008/0130126 A1 | 6/2008 | Brooks et al. |

FOREIGN PATENT DOCUMENTS

| | | |
|---|---|---|
| EP | 0 655 347 | 9/1997 |
| EP | 0 615 860 | 8/1998 |
| EP | 1 079 274 | 12/2004 |
| GB | 1 308 116 | 2/1973 |
| GB | 1 433 025 | 4/1976 |
| GB | 2 083 726 | 3/1982 |
| JP | 61-261701 | 11/1986 |
| JP | 01 065153 | 3/1989 |
| JP | 1-181083 | 12/1989 |
| JP | 03 068610 | 3/1991 |
| JP | 03 068611 | 3/1991 |
| JP | 4309583 | 11/1992 |
| JP | 6-308895 | 11/1994 |
| JP | 7-140571 | 6/1995 |
| JP | 7-281327 | 10/1995 |
| JP | 10-186276 | 7/1998 |
| JP | 11-500236 | 1/1999 |
| JP | 2001-116917 | 10/1999 |
| WO | WO 83/03019 | 9/1983 |
| WO | WO 95/26281 | 10/1995 |
| WO | WO 96/24867 | 8/1996 |
| WO | WO 97/15173 | 4/1997 |
| WO | WO 97/46631 | 12/1997 |
| WO | WO 99/37949 | 7/1999 |
| WO | WO 99/42147 | 8/1999 |
| WO | WO 02/22376 A1 | 3/2002 |
| WO | WO 03/022598 A1 | 3/2003 |
| WO | WO 03/061983 | 7/2003 |
| WO | WO 03/093341 | 11/2003 |

OTHER PUBLICATIONS

Lendlein et al., "Shape-Memory Polymers as Stimuli-Sensitive Implant Materials," Clinical Hemorheology and Microcirculation, IOS Press, Amsterdam, NL, vol. 32, No. 2, Jan. 1, 2005, pp. 105-116.

Yu. A. Dudknikov, B.K. Rozhkov, and E.N. Antipova, "Obtaining a Portrait of a Person by the Integral Photography Method," Dec. 20, 1979, pp. 562-563, Sov. J. Opt. Technol. 47(9), Sep. 1980, © 1981 The Optical Society of America.

Yu. A. Dudknikov and B.K. Rozhkov, "Selecting the Parameters of the Lens-Array Photgraphing System in Integral Photograpy," Feb. 24, 1977, pp. 349-351, Sov. J. Opt. Technol. 45(6), Jun. 1978, © 1979 The Optical Society of America.

Kim et al., "Polyurethanes having shape memory effects", *Polymer*, vol. 37 No. 26, pp. 5781-5793, 1996.

Lendlein et al., "AB-polymer networks based on oligo($\epsilon$-caprolactone) segments showing shape-memory properties", *PNAS*, vol. 98 No. 3, pp. 842-847, 2001.

Lendlein and Kelch, "Shape-memory polymers", *Angew. Chem. Int. Ed.* 2002, 41, 2034-2057.

Lendlein and Langer, "Biodegradable, elastic shape-memory polymers for potential biomedical applications", *Science*, vol, 296, pp. 1673-1676, 2002.

Mazurek et al., "Novel materials based on silicone-acrylate copolymer networks", *Journal of Applied Polymer Science*, vol. 80, pp. 159-180, 2001.

Factiva WireWatch Message, "Shape-memory polymers offer new twist on applications", *Modern Plastics International, Chemical Business NewsBase*, Apr. 24, 2003.

Weekly Reports of the Meetings of the Academy of Science published, in accordance with an academy decision dated Jul. 13, 1835, vol. 146, Jan.-Jun. 1908, pp. 446-451.

3M Security Systems Division, 3M™ Full Page Reader Product Fact Sheet, 2004, 6 pages.

3M Security Systems Division, 3M™ ePassport Reader Product Fact Sheet, 2004, 6 pages.

3M Security Systems Division, 3M™ Inspection Reader Product Fact Sheet, 2004, 2 pages.

3M Security Systems Division, 3M™ Authentication Reader Product Fact Sheet, 2004, 4 pages.

Yu. A. Dudknikov, B.K. Rozhkov, "Raster 3D Imaging Systems", Leningrad, Maschinostroeniye, Ch. 4, pp. 102-173; Section 5.5, pp. 190-199 and Section 5.9, pp. 206-209, (1986).

Supplementary European Search Report in International Application No. PCT/US2006039537 dated Oct. 4, 2010.

* cited by examiner

METHODS OF FORMING SHEETING WITH A COMPOSITE IMAGE THAT FLOATS AND SHEETING WITH A COMPOSITE IMAGE THAT FLOATS

FIELD OF THE INVENTION

The present invention relates to methods of forming images on sheeting that provide one or more composite images that are perceived by an observer to be suspended in space relative to the sheeting, and in which the perspective of the composite image changes with the viewing angle. The present invention also relates to sheeting that provides one or more composite images that are perceived by an observer to be suspended in space relative to the sheeting, and in which the perspective of the composite image changes with the viewing angle.

BACKGROUND OF THE INVENTION

Sheeting materials having a graphic image or other mark have been widely used, particularly as labels for authenticating an article or document. For example, sheetings such as those described in U.S. Pat. Nos. 3,154,872; 3,801,183; 4,082,426; and 4,099,838 have been used as validation stickers for vehicle license plates, and as security films for driver's licenses, government documents, tape cassettes, playing cards, beverage containers, and the like. Other uses include graphics applications for identification purposes such as on police, fire or other emergency vehicles, in advertising and promotional displays and as distinctive labels to provide brand enhancement.

Another form of imaged sheeting is disclosed in U.S. Pat. No. 4,200,875 (Galanos). Galanos discloses the use of a particularly "high-gain retroreflective sheeting of the exposed-lens type," in which images are formed by laser irradiation of the sheeting through a mask or pattern. That sheeting comprises a plurality of transparent glass microspheres partially embedded in a binder layer and partially exposed above the binder layer, with a metal reflective layer coated on the embedded surface of each of the plurality of microspheres. The binder layer contains carbon black, which is said to minimize any stray light that impinges on the sheeting while it is being imaged. The energy of the laser beam is further concentrated by the focusing effect of the microlenses embedded in the binder layer.

The images formed in the retroreflective sheeting of Galanos can be viewed if, and only if, the sheeting is viewed from the same angle at which the laser irradiation was directed at the sheeting. That means, in different terms, that the image is only viewable over a very limited observation angle. For that and other reasons, there has been a desire to improve certain properties of such a sheeting.

As early as 1908, Gabriel Lippman invented a method for producing a true three-dimensional image of a scene in lenticular media having one or more photosensitive layers. That process, known as integral photography, is also described in De Montebello, "Processing and Display of Three-Dimensional Data II" in Proceedings of SPIE, San Diego, 1984. In Lippman's method, a photographic plate is exposed through an array of lenses (or "lenslets"), so that each lenslet of the array transmits a miniature image of the scene being reproduced, as seen from the perspective of the point of the sheet occupied by that lenslet, to the photosensitive layers on a photographic plate. After the photographic plate has been developed, an observer looking at the composite image on the plate through the lenslet array sees a three-dimensional representation of the scene photographed. The image may be in black and white or in color, depending on the photosensitive materials used.

Because the image formed by the lenslets during exposure of the plate has undergone only a single inversion of each miniature image, the three-dimensional representation produced is pseudoscopic. That is, the perceived depth of the image is inverted so that the object appears "inside out." This is a major disadvantage, because to correct the image it is necessary to achieve a second optical inversion. These methods are complex, involving multiple exposures with a single camera, or multiple cameras, or multi-lens cameras, to record a plurality of views of the same object, and require extremely accurate registration of multiple images to provide a single three-dimensional image. Further, any method that relies on a conventional camera requires the presence of a real object before the camera. This further renders that method ill-adapted for producing three-dimensional images of a virtual object (meaning an object that exists in effect, but not in fact). A further disadvantage of integral photography is that the composite image must be illuminated from the viewing side to form a real image that may be viewed.

Another form of imaged sheeting is disclosed in U.S. Pat. No. 6,288,842 (Florczak et al.). Florczak et al. discloses microlens sheeting with composite images, in which the composite image floats above or below the sheeting, or both. The composite image may be two-dimensional or three-dimensional. Methods for providing such sheeting, including by the application of radiation to a radiation sensitive material layer adjacent the microlenses, are also disclosed. This patent discloses that images are created as a result of a compositional change, a removal or ablation of the material, a phase change, or a polymerization of the coating disposed adjacent to one side of the microlens layer or layers.

U.S. Pat. No. 5,712,731, "Security Device for Security Documents Such as Bank Notes and Credit Cards," (Drinkwater et al.) discloses a security device that includes an array of microimages which, when viewed through a corresponding array of substantially spherical microlenses, generates a magnified image. In some cases, the array of microlenses is bonded to the array of microimages.

PCT Patent Application Publication, WO 03/061983 A1, "Micro-Optics For Article Identification" discloses methods and compositions for identification and counterfeit deterrence using non-holographic micro-optics and microstructures having a surface relief greater than a few microns.

SUMMARY OF THE INVENTION

One aspect of the present invention provides a method of forming a composite image on a microlens sheeting. In this particular embodiment, the method comprises the steps of: providing a sheeting having an array of microlenses and a material layer adjacent the array of microlenses; providing a first donor substrate adjacent the material layer of the sheeting, where the first donor substrate is radiation sensitive; providing a radiation source; and transferring at least a portion of the first donor substrate to the sheeting using the radiation source to form individual, partially complete images on the material layer associated with each of a plurality of the microlenses, whereby the sheeting exhibits a composite image, provided by the individual images, that appears to the unaided eye to float above or below the sheeting, or both.

In one embodiment of the above method, the first donor substrate comprises a colorant. In one aspect of this embodiment, at least a portion of the composite image exhibits a color similar to the colorant in the first donor substrate. In another embodiment of the above method, the method further includes the step of: positioning the sheeting and the first donor substrate in close proximity to each other prior to the transferring step. In one aspect of this embodiment, the method further comprises the steps of: providing a vacuum source; and using the vacuum source during the positioning step to position the sheeting and the first donor substrate in close proximity to each other, prior to the transferring step.

In another embodiment of the above method, the method further comprises the step of: providing a gap between the sheeting and the first donor substrate prior to the transferring step. In one aspect of this embodiment, the gap is provided by microstructures. In another embodiment of the above method, the individual images are formed by multiple patterned exposures of the radiation source, with the sheeting and the first donor film being at different positions relative to the radiation source during each exposure. In another embodiment of the above method, the method is repeated to provide more than one composite image on the sheeting. In yet another embodiment of the above method, the composite image is a two-dimensional image. In another embodiment of the above method, the composite image is a three-dimensional image.

In another embodiment of the above method, the material layer and microlenses are made from the same material. In another embodiment of the above method, the material layer comprises a polyester and the microlenses comprise an acrylate. In another embodiment of the above method, the radiation source provides radiation with a wavelength of between 200 nm and 11 um.

In yet another embodiment of the above method, the method further comprises the steps of: removing the first donor layer; providing a second donor layer adjacent the material layer of the sheeting, where the second donor substrate is radiation sensitive; and repeating the transferring step with the second donor layer. In one aspect of this embodiment, the second donor layer comprises a colorant different from the colorant of the first donor layer. In another aspect of this embodiment, at least a portion of the composite image exhibits colors similar to the colorants in the first donor substrate and the second donor substrate. In another aspect of this embodiment, at least a portion of the composite image exhibits a color similar to a mixture of the colorants in the first donor substrate and the second donor substrate. In yet another aspect of this embodiment, at least a portion of the composite image exhibits a multicolored composite image.

In yet another embodiment of the above method, the method provides sheeting made by the method. In one aspect of this embodiment, the sheeting further comprises an adhesive layer for applying the sheeting to a substrate. In one aspect of this embodiment, the sheeting is adhered to a substrate. In another aspect of this embodiment, the substrate is a document, a sign, an identification card, a container, currency, a display, a credit card, or the sheeting is used for advertising, decoration, authentication, or identification purposes. In yet another embodiment of the above method, the composite image also appears to the unaided eye to be at least in part in the plane of the sheeting.

Another aspect of the present invention provides a sheeting. In this particular embodiment, the sheeting comprises: an array of microlenses; a material layer adjacent the array of microlenses; a first donor material in contact with the material layer, where the donor material forms individual, partially complete images on the material layer associated with each of a plurality of the microlenses, whereby the sheeting exhibits a composite image, provided by the individual images, that appears to the unaided eye to float above or below the sheeting, or both.

In one embodiment of the above sheeting, the composite image appears under reflected light to float above the sheeting. In another embodiment of the above sheeting, the composite image appears in transmitted light to float above the sheeting. In another embodiment of the above sheeting, the composite image appears under reflected light to float below the sheeting. In another embodiment of the above sheeting, the composite image appears in transmitted light to float below the sheeting. In yet another embodiment of the above sheeting, at least part of the composite image fluoresces and/or phosphoresces and appears to the unaided eye to float above or below the sheeting or both. In another embodiment of the above sheeting, the composite image also appears to the unaided eye to be at least in part in the plane of the sheeting.

In another embodiment of the above sheeting, the first donor material comprises a colorant. In one aspect of this embodiment, at least a portion of the composite image exhibits a color similar to the colorant in the donor material. In another embodiment of the above sheeting, the donor material comprises radiation sensitive material. In yet another embodiment of the above sheeting, the donor material comprises a metallic radiation sensitive material. In another embodiment of the above sheeting, the donor material comprises a nonmetallic radiation sensitive material. In another embodiment of the above sheeting, the sheeting is an exposed lens sheeting. In another embodiment of the above sheeting, the sheeting is an embedded lens sheeting.

In yet another embodiment of the above sheeting, the composite image is perceptible across a viewing angle of less than one hundred fifty (150) degrees. In another embodiment of the above sheeting, the composite image appears to move relative to the sheeting as the viewing position changes relative to the sheeting. In another embodiment of the above sheeting, the composite image disappears and reappears when the angle at which the sheeting is viewed changes. In another embodiment of the above sheeting, the color of the composite image changes relative to a viewing angle of less than one hundred fifty (150) degrees. In another embodiment of the above sheeting, the sheeting comprises more than one composite image. In another embodiment of the above sheeting, the composite image is a two-dimensional image. In yet another embodiment of the above sheeting, the composite image is a three-dimensional image.

In another embodiment of the above sheeting, the sheeting further comprises a second donor material adjacent the material layer, where the second donor material forms individual, partially complete images on the sheeting associated with each of a plurality of the microlenses. In one aspect of this embodiment, the second donor material comprises a colorant different from the colorant of the first donor material. In another aspect of this embodiment, at least a portion of the composite image exhibits colors similar to the colorants in the first donor material and the second donor material. In another aspect of this embodiment, at least a portion of the composite image exhibits a color similar to a mixture of the colorants in the first donor material and the second donor material.

In another embodiment of the above sheeting, the first donor material comprises a colorant and provides a first composite image, and where the second donor material provides a second composite image that fluoresces and/or phosphoresces. In another embodiment of the above sheeting, the sheeting further comprises an adhesive layer for applying the sheeting to a substrate. In one aspect of this embodiment, the sheeting is adhered to a substrate. In another aspect of this embodiment, the substrate is a document, a sign, an identification card, a container, a display, a credit card, or where the sheeting is used for advertising, decoration, authentication or identification purposes.

In another embodiment of the above sheeting, the composite image also appears to the unaided eye to be at least in part in the plane of the sheeting. In another embodiment of the above sheeting, where the sheeting includes a window without the presence of microlenses.

BRIEF DESCRIPTION OF THE DRAWINGS

The invention will be described herein with reference to the appended drawings, in which.

DETAILED DESCRIPTION OF THE INVENTION

The microlens sheeting of the present invention and the method of imaging the same produces a composite image, provided by individual partially complete images and/or individual complete images associated with a number of the microlenses, that appears to be suspended, or to float above, in the plane of, and/or below the sheeting. These suspended images are referred to for convenience as floating images, and they can be located above or below the sheeting (either as two or three-dimensional images), or can be a three-dimensional image that appears above, in the plane of, and below the sheeting. The images can be in black and white or in color, and can appear to move with the observer. Unlike some holographic sheetings, imaged sheeting of the present invention cannot be used to create a replica of itself. Additionally, the floating image(s) can be observed by a viewer with the unaided eye.

The sheeting, imaged by the methods of the present invention, has a composite image as described and may be used in a variety of applications such as securing tamperproof images in passports, ID badges, event passes, affinity cards, product identification formats, currency, and advertising promotions for verification and authenticity, brand enhancement images which provide a floating or sinking or a floating and sinking image of the brand, identification presentation images in graphics applications such as emblems for police, fire or other emergency vehicles; information presentation images in graphics applications such as kiosks, night signs and automotive dashboard displays; and novelty enhancement through the use of composite images on products such as business cards, hang-tags, art, shoes and bottled products.

The present invention further provides an inventive method of forming imaged sheeting containing the described composite images. In one embodiment, a single composite image is formed. Embodiments are also disclosed in which two or more composite images are formed, as well as composite images that appear to be above, below, or in the plane of the sheeting. Other embodiments could consist of combinations of conventionally printed images and composite images formed by this invention.

U.S. Pat. No. 6,288,842 (Florczak et al.) discloses that floating images on microlens sheeting are created as a result of a compositional change, a removal or ablation of the material, a phase change, or a polymerization of the coating disposed adjacent to one side of the microlens layer or layers. In contrast, the present inventive method creates floating images on microlens sheeting by the addition of material on the microlens sheeting.

Figure 1:
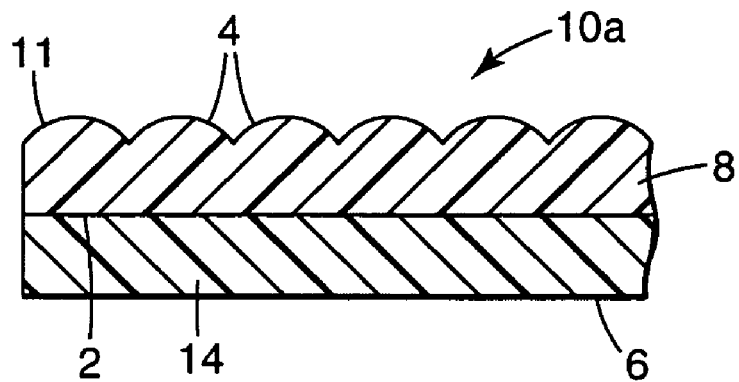
FIG. 1 is an enlarged cross sectional view of a microlens sheeting comprising a plano-convex base sheet.
Figure 2:
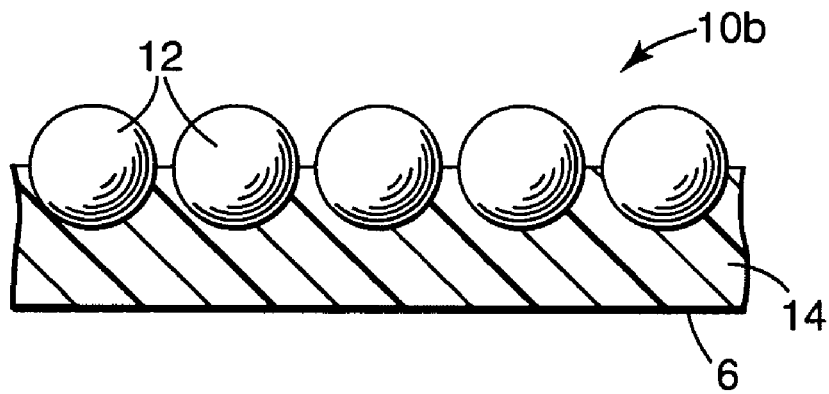
FIG. 2 is an enlarged cross sectional view of an "exposed lens" microlens sheeting.

Microlens sheeting in which the images of this invention can be formed comprise one or more discrete layers of microlenses with a layer of material adjacent to one side of the microlens layer or layers. For example, FIG. 1 illustrates one embodiment of a suitable type of microlens sheeting 10a. This sheeting comprises a transparent base sheet 8 having first and second broad faces, the second face 2 being substantially planer and the first face 11 having an array of substantially spherical or aspherical microlenses 4. A layer of material 14 is optionally provided on the second face 2 of the base sheet 8. The layer of material 14 includes a first side 6 for receiving donor material as described in more detail below. FIG. 2 illustrates another embodiment of a suitable type of microlens sheeting 10b. The shape of the microlenses and thickness of the base sheet and their variability are selected such that light appropriate for viewing the sheeting is focused approximately at the first face 6. In this embodiment, the microlens sheeting is an "exposed lens" type of microlens sheeting 10b that includes a monolayer of transparent microspheres 12 that are partially embedded in a material layer 14, which is also typically a bead binder layer, such as a polymeric material. The layer of material 14 includes a first side 6 for receiving donor material as described in more detail below. The microspheres 12 are transparent both to the wavelengths of radiation that may be used to image the donor substrate material (explained in more detail below), as well as to the wavelengths of light in which the composite image will be viewed. This type of sheeting is described in greater detail in U.S. Pat. No. 3,801,183, except where the bead bond layer is very thin, for instance, to the extent where the bead bond layer is only between the beads, or occupying the interstitial spaces between the beads. Alternatively, this type of sheeting can be made by using microspheres of an appropriate optical index for focusing radiation approximately on the first side 6 of the layer of material 14 when the bead bond is of the thickness taught in U.S. Pat. No. 3,801,183. Such microspheres include polymethyl methylacrylate beads, which are commercially available from Esprix Technologies based in Sarasota, Fla.

Figure 3:
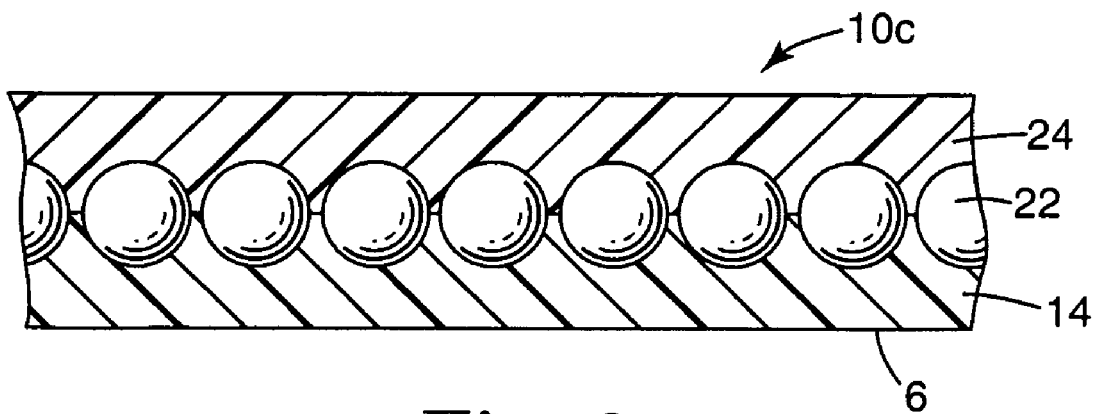
FIG. 3 is an enlarged cross sectional view of an "embedded lens" microlens sheeting.

FIG. 3 illustrates another embodiment of a suitable type of microlens sheeting 10c. In this embodiment, the microlens sheeting is an "embedded-lens" type of sheeting 10c in which the microsphere lenses 22 are embedded between a transparent protective overcoat 24, which is typically a polymeric material, and a material layer 14, which is also typically a bead binder layer, such as a polymeric material. The layer of material 14 includes a first side 6 for receiving donor material as described in more detail below. This type of sheeting is described in greater detail in U.S. Pat. No. 3,801,183, except that the reflective layer and adhesive would be removed, and the spacing layer 14 is reformulated so as to be less conformal to the curvature of the microspheres.

The microlenses of the sheeting 10 preferably have image forming refractive elements in order for image formation (described in more detail below) to occur; this is generally provided by forming spherically or aspherically shaped features. Other useful materials that provide a gradient refractive index (GRIN) will not necessarily need a curved surface to refract light. The microlenses may have any symmetry, such as cylindrical or spherical, provided real images are formed by the refraction surfaces. The microlenses themselves can be of discrete form, such as round plano-convex lenslets, round double convex lenslets, Fresnel lenslets, diffractive lenslets, rods, microspheres, beads, or cylindrical lenslets. Materials from which the microlenses can be formed include glass, polymers, minerals, crystals, semiconductors and combinations of these and other materials. Non-discrete microlens elements may also be used. Thus, microlenses formed from a replication or embossing process (where the surface of the sheeting is altered in shape to produce a repetitive profile with imaging characteristics) can also be used.

Microlenses with a uniform refractive index of between 1.4 and 3.0 over the visible and infrared wavelengths are preferred and more preferably, between 1.4 and 2.5, although not required. The refractive power of the microlenses, whether the individual microlenses are discrete or replicated, and regardless of the material from which the microlenses are made, is preferably such that the light incident upon the optical elements will focus on or near the first side 6 of the material layer 14. In certain embodiments, the microlenses preferably form a demagnified real image at the appropriate position on that layer. The construction of the microlens sheeting provides the necessary focusing conditions so that energy incident upon the front surface of the microlens sheeting is approximately focused upon a separate donor layer that is preferably radiation sensitive, which is described in more detail below.

Microlenses with diameters ranging from 15 micrometers to 275 micrometers are preferable, though other sized microlenses may be used. Good composite image resolution can be obtained by using microlenses having diameters in the smaller end of the aforementioned range for composite images that are to appear to be spaced apart from the microlens layer by a relatively short distance, and by using larger microlenses for composite images that are to appear to be spaced apart from the microlens layer by larger distances. Other microlenses, such as plano-convex, spherical or aspherical microlenses having lenslet dimensions comparable to those indicated for the microlenses, can be expected to produce similar optical results. Cylindrical lenses having lenslet dimensions comparable to those indicated for the microlenses can be expected to produce similar optical results, although different or alternative imaging optics train may be required.

As noted above, a layer of material 14 in FIGS. 1, 2 and 3 may be provided adjacent to the microlenses in the microlens sheeting 10. Suitable materials for the material layer 14 in the sheeting 10 include silicone, polyester, polyurethane, polycarbonate, polypropylene, or any other polymer capable of being made into sheeting or being supported by the base sheet 8. In one embodiment, the sheeting 10 may include a microlens layer and a material layer that are made from different materials. For example, the microlens layer may include acrylates, and the material layer may include polyester. In other embodiments, the sheeting 10 may include a microlens layer and a material layer that are made from the same materials. For example, the microlens and material layer of the sheeting 10 may be made of silicone, polyester, polyurethane, polycarbonate, polypropylene, or any other polymer capable of being made into sheeting, and may be formed by methods of mechanical embossing, replication or molding.

As described in more detail in reference to FIGS. 4 and 5 below, individual, partially complete images are formed on the material layer 14 associated with a plurality of microlenses using a donor substrate material, which, when viewed by an observer in front of said microlenses under reflected or transmitted light, provides a composite image that appears to be suspended, or float, above, in the plane of, and/or below the sheeting. Although other methods may be used, the preferred method for providing such images is to provide a radiation sensitive donor material, and to use radiation to transfer that donor material in a desired manner to provide the individual, partially complete images on the first side of the layer of material. This transfer process could include meltstick, sublimation, additive ablation (material transfer to a substrate by ablating a donor), diffusion and/or other physical material transfer processes.

Suitable radiation sensitive donor material substrates useful for this invention include substrates coated with colorants in a binder, with or without additional radiation sensitive materials. The donor materials could be provided in bulk form or in roll form. As used in reference to the present invention, donor substrate material is "radiation sensitive" if, upon exposure to a given level of radiation, a portion of the donor material exposed transfers or preferentially adheres to a different location. The individual, partially complete images (illustrated in FIGS. 7 and 9) are created as a result of an at least partial or complete removal of the radiation sensitive donor substrate material or colorant material from the donor substrate and the subsequent transfer of the donor substrate material or colorant material to the material layer of the microlens sheeting 10.

Figure 4A:
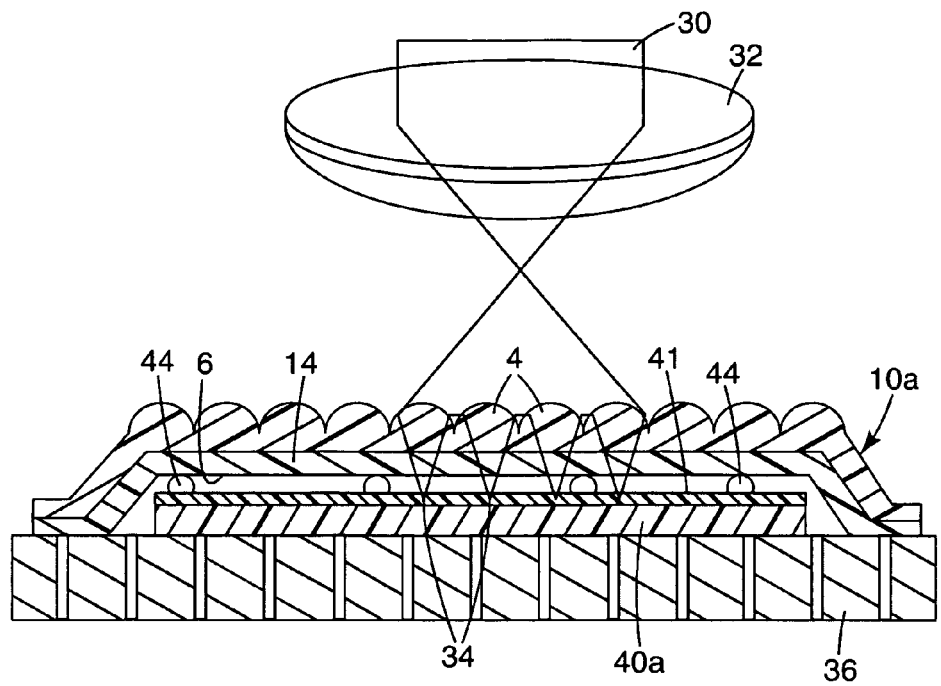
FIGS. 4a and 4b schematically illustrate one embodiment of the method in accordance with the present invention using a first donor sheet.
Figure 8:
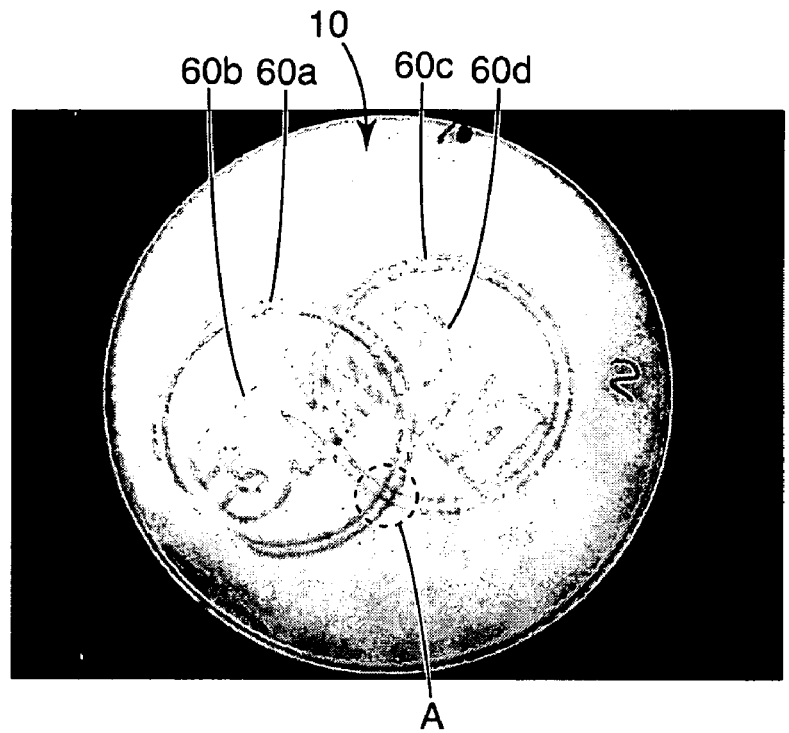
FIG. 8 is a photograph of a portion of microlens sheeting illustrating at least two composite images that appear to float above or below the sheeting in accordance with the present invention.

In one embodiment, the donor substrate includes colorants providing color within the visible spectrum, such as pigments, dyes, inks, or a combination of any or all of these to provide color composite floating images, such as those illustrated in FIG. 8. The pigments or dyes may be phosphorescent or fluorescent. Alternatively, the colorants in the donor materials may also appear metallic. The color of the resulting floating image is generally similar to the color of the colorant in the donor substrate, if the transferred donor substrate components are thermally stable and only small chemical or compositional changes occur upon transfer. In addition, the color of the resulting composite floating image may be the same as the color of the colorant in the donor substrate. In yet another embodiment, the donor substrates may include macroscopic patterns of different colorants, such as stripes or zones of different colors throughout the substrate or multicolored substrates. In alternative embodiments, the donor substrate is not required to include colorants providing color in the visible spectrum, and instead, the resulting composite floating images would appear colorless. Such donor substrates could contain colorless fluorescing dyes or phosphorescent materials, creating composite images visible only during or after exposure to specific wavelengths, or in the case of phosphorescent materials, during and for a duration after exposure to the wavelengths. Alternatively, such donor substrates may contain colorless materials that may or may not have a refractive index different than the material layer 14. A composite image formed from such donor materials may be only slightly visible when viewed in ambient lighting as in FIG. 11; however, it may appear to shine brighter than the reflections off of the nonimaged area of surface 6 when viewed with light substantially perpendicular to surface 6. All donor substrates may optionally include additives that increase the substrate sensitivity to imaging radiation and ultimately aid in the transfer of the material, or said substrates may include a reflective and/or absorbing layer underneath at least the colorant to increase absorption of the radiation. FIG. 4a schematically illustrates one embodiment of the method of forming a composite image on the microlens sheeting 10 in accordance with the present invention. The method includes using a radiation source 30. Any energy source providing radiation of the desired intensity and wavelength may be used as radiation source 30 with the method of the present invention. In one embodiment, radiation devices capable of providing radiation having a wavelength of between 200 nanometers and 11 micrometers are preferred, and more preferably, between 270 nanometers and 1.5 micrometers. Examples of high peak power radiation sources useful for this invention include passively Q-switched microchip lasers, and the family of Q-switched Neodymium doped lasers, and their frequency doubled, tripled, and quadrupled versions of any of these lasers, and Titanium doped-sapphire (abbreviated Ti:sapphire) lasers. Other examples of useful radiation sources include devices that give low peak power such as laser diodes, ion lasers, non Q-switched solid state lasers, metal vapor lasers, gas lasers, arc lamps and high power incandescent light sources.

For all useful radiation sources, the energy from the radiation source 30 is directed toward the microlens sheeting material 10 and controlled to give a highly divergent beam of energy. For energy sources in the ultraviolet, visible, and infrared portions of the electromagnetic spectrum, the light is controlled by appropriate optical elements, known to those skilled in the art. In one embodiment, a requirement of this arrangement of optical elements, commonly referred to as an optical train, is that the optical train direct light toward the sheeting material with appropriate divergence or spread so as to produce a "cone" of radiation irradiating the microlenses at the desired angles, thus irradiating the donor material aligned to said microlenses. The composite images of the present invention are preferably obtained by using radiation spreading devices with numerical apertures (defined as the sine of the half angle of the maximum diverging rays) of greater than or equal to 0.3, although smaller numerical aperture illumination may be used. Radiation spreading devices with larger numerical apertures produce composite images having a greater viewing angle, and a greater range of apparent movement of the image. In alternative embodiments, the optical train may additionally contain elements to prevent radiation in an angular portion or portions of the cone of radiation. The resulting composite image(s) are only viewable over angles corresponding to the unblocked angular sections of the modified cone. Multiple composite images may be created at separate angular sections of the modified cone if desired. Using the modified cone and its inverse, one can produce a composite image that changes from one color to another as the sample is tilted. Alternatively, multiple composite images can be produced in the same area causing the individual images to appear and disappear as the sample is tilted.

Figure 4B:
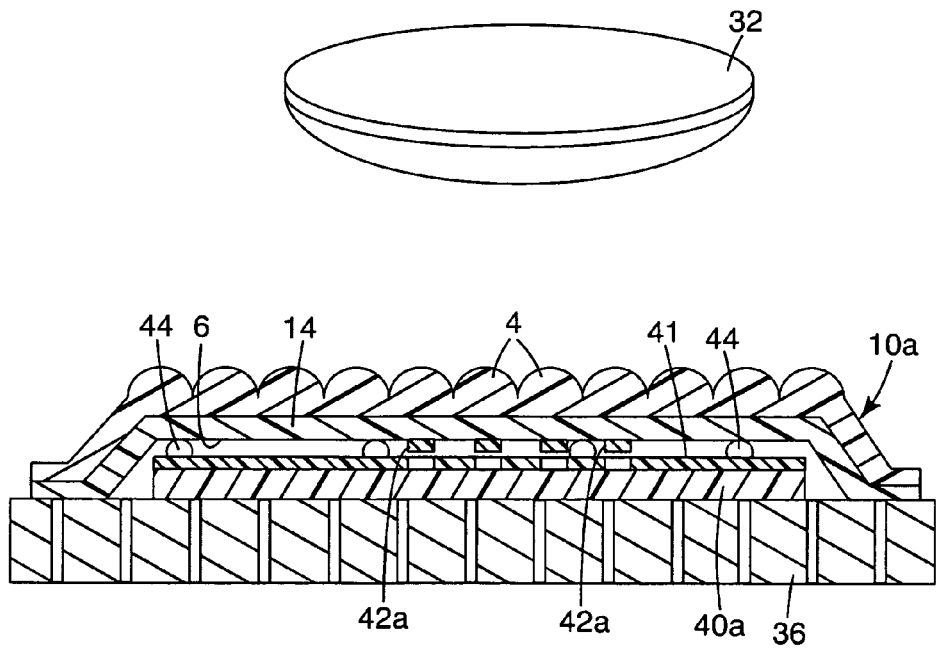

An exemplary imaging process according to the present invention includes the following steps, as illustrated in FIGS. 4a and 4b. FIG. 4a illustrates the imaging process by the radiation source, and FIG. 4b illustrates the resulting sheeting 10 after the imaging process. First, a microlens sheeting 10 is provided, such as the microlens sheeting 10a, 10b, 10c illustrated in FIGS. 1-3. FIG. 4a illustrates the use of microlens sheeting 10a, however, microlens sheeting 10b or 10c may be used in the process. Next, a first donor substrate 40a is provided, such as the donor substrates described above. Next, the microlens sheeting 10 is positioned adjacent or orientated next to the donor substrate 40a, such that the microlens sheeting 10 is between the radiation source 30 and the donor substrate 40a. In one embodiment, the microlens sheeting 10 and donor substrate 40a are in close proximity to each other. In another embodiment, the microlens sheeting 10 and donor substrate 40a are in contact with one another or pressed against each other, for instance by gravity, mechanical means, or pressure gradients produced by a vacuum source 36, as illustrated in FIG. 4a. In yet another embodiment, microstructures 44 are between the microlens sheeting 10 and donor substrate 40a to provide a generally uniform gap or space between the microlens sheeting 10 and the donor substrate 40a. The microstructures 44 may be independent microstructures that are positioned between the microlens sheeting 10 and the donor substrate 40a. Examples of such independent microstructures 44 include polymethylmethacrylate spheres, polystyrene spheres, and silica spheres, all of which are commercially available from Esprix Technologies based in Sarasota, Fla. Alternatively, the microstructures 44 may extend from either the donor substrate 40a towards the microlens sheeting 10 or from the first side 6 of the layer of material 14 in the sheeting 10. Examples of suitable donor substrates 40 including such microstructures 44 include Kodak™ Approval media and Matchprint Digital Halftone media, commercially available from Kodak Polychrome Graphics located in Norwalk, Conn. Suitable microlens sheeting including such microstructures 44 are readily made, such as by replication, by those skilled in the art. Regardless, there is preferably a generally uniform spacing distance or gap between the microlens sheeting 10 and the donor substrate 40a which is determined and controlled by the size, spacing, arrangement and area coverage of microstructures 44. This generally uniform gap provides generally uniform registration between the top surface 41 of the donor substrate 40a and the focal points of the microlens optics 34.

Next, the method includes the step of transferring portions of donor material from the first donor material substrate 40a to the first side 6 of the layer of material 14 of the sheeting 10 to form individual, partially complete images on the first side 6 of material layer 14, as illustrated in FIG. 4b. In one embodiment of the inventive method illustrated in FIGS. 4a and 4b, this transfer is obtained by directing collimated light from a radiation source 30 through a lens 32 toward the microlens sheeting 10. The radiation source 30 is focused through the lens 32, through the microlens sheeting 10 and to the donor substrate 40a. The focal point 34 of the microlens 4 is approximately at the interface between the donor substrate 40a and the first side 6 of material layer 14 in the microlens sheeting 10 as illustrated in FIG. 4a. The donor material of substrate 40a absorbs incident radiation near the focal point 34 of the microlenses 4 on sheeting 10a. The absorption of the radiation induces the donor material of donor substrate 40a to transfer to the first side 6 of material layer 14 on sheeting 10a creating image pixels of donor material 42a that comprise the partially complete images corresponding to microlenses 4 of sheeting 10a as illustrated in FIG. 4b. In alternative embodiments of this process where the first side 6 of material layer 14 on sheeting 10a is in close proximity to the donor material 40a or adhered to the donor material 40a, transfer mechanisms such as radiation-induced diffusion and preferential adhesion (melt-stick process) producing image pixels of donor material 42a that comprise the partially complete images corresponding to microlenses 4 of sheeting 10a are also possible. The transferred donor material 42a may have experienced a change in its chemical or composition or component concentrations. These individual, partially complete images made from the donor material 42a together provide the composite floating image, which appears to the unaided eye to float above or below the sheeting 10 or both, as described further below.

Because each individual microlens 4 occupies a unique position relative to the optical axis, the radiation impinging on each microlens 4 will have a unique angle of incidence relative to the radiation incident on each other microlens. Thus, the light will be transmitted by each microlens 4 to a unique position relative to its specific microlens 4 on the donor substrate 40a close to focal point 34, and produces a unique image pixel of a partially complete image of donor materials 42a on the first side 6 of the layer of material 14 corresponding to each microlens 4. More precisely, a single light pulse produces only a single imaged dot of donor material 42a behind each properly exposed microlens 4, so to provide a partially complete image adjacent each microlens on the first side 6 of the material layer 14 of the sheeting 10. Multiple radiation pulses, or a quickly traversing, continuously illuminating, radiation beam may be used to create the image. For each pulse, the focal point of lens 32 is located at a new position relative to the position of the focal point 34 during the previous pulse relative to the microlensed sheeting. These successive changes in the position of the focal point 32 of the lens 32 relative to the microlenses 4 results in a corresponding change in the angle of incidence upon each microlens 4, and accordingly, in the position of the imaged pixel of the partially complete image of donor material 42a created on the material layer 14 of the sheeting 10 with the donor material 42 by that pulse. As a result, the radiation incident on the donor substrate 40a near focal point 34 causes transfer of a selected pattern of the radiation sensitive donor material 42a. Because the position of each microlens 4 is unique relative to every optical axis, the partially complete image formed by the transferred radiation sensitive donor material 42a for each microlens will be different from the image associated with every other microlens, because each microlens "sees" the incoming radiation from a different position. Thus, a unique image is formed associated with each microlens with the donor material 42a from the donor substrate on the material layer 14.

Another method for forming floating composite images uses a divergence creating target such as a lens array to produce the highly divergent light to image the microlensed material. For example, the lens array could consist of multiple small lenses all with high numerical apertures arranged in a planar geometry. When the array is illuminated by a light source, the array will produce multiple cones of highly divergent light, each individual cone being centered upon its corresponding lens in the array. The physical dimensions of the array are chosen to accommodate the largest lateral size of a composite image. By virtue of the size of the array, the individual cones of energy formed by the lenslets will expose the microlensed material as if an individual lens was positioned sequentially at all points of the array while receiving pulses of light. The selection of which lenses receive the incident light may occur by the use of a reflective mask, diffractive pattern generator, or by individually illuminating specific locations of the target with a low numerical aperture radiation beam. This mask will have transparent areas corresponding to sections of the composite image that are to be exposed and reflective areas where the image should not be exposed. Due to the lateral extent of the lens array, it may not be necessary to use multiple light pulses to trace out the image.

By having the mask fully illuminated by the incident energy, the portions of the mask that allow energy to pass through will form many individual cones of highly divergent light outlining the floating image as if the image was traced out by a single lens. As a result, only a single light pulse is needed to form the entire composite image in the microlens sheeting. Alternatively, in place of a reflective mask, a beam positioning system, such as a galvanometric xy scanner, can be used to locally illuminate the lens array and trace the composite image on the array. Since the energy is spatially localized with this technique, only a few lenslets in the array are illuminated at any given time. Those lenslets that are illuminated will provide the cones of highly diverging light needed to expose the microlensed material to form the composite image in the sheetings.

After imaging, depending upon the desirable viewable size of the composite image, a full or partially complete image will be present on the first side 6 of material layer 14 of the sheeting 10 behind each sufficiently exposed microlens formed from the donor material 42a. The extent to which an image is formed behind each microlens 4 on the material layer 14 depends on the energy incident upon that microlens. Portions of an intended image may be distant enough from a region of microlenses that the radiation incident upon those microlenses has an energy density lower than the level of radiation required to transfer corresponding donor material 42. Moreover, for a spatially extended image, when imaging with a fixed NA lens, not all portions of the sheeting will be exposed to the incident radiation for all parts of the intended image. As a result, portions of the intended image will not result in transferred radiation sensitive material, and only a partial image of the intended image will appear behind those microlenses on the material layer 14.

Figure 5A:
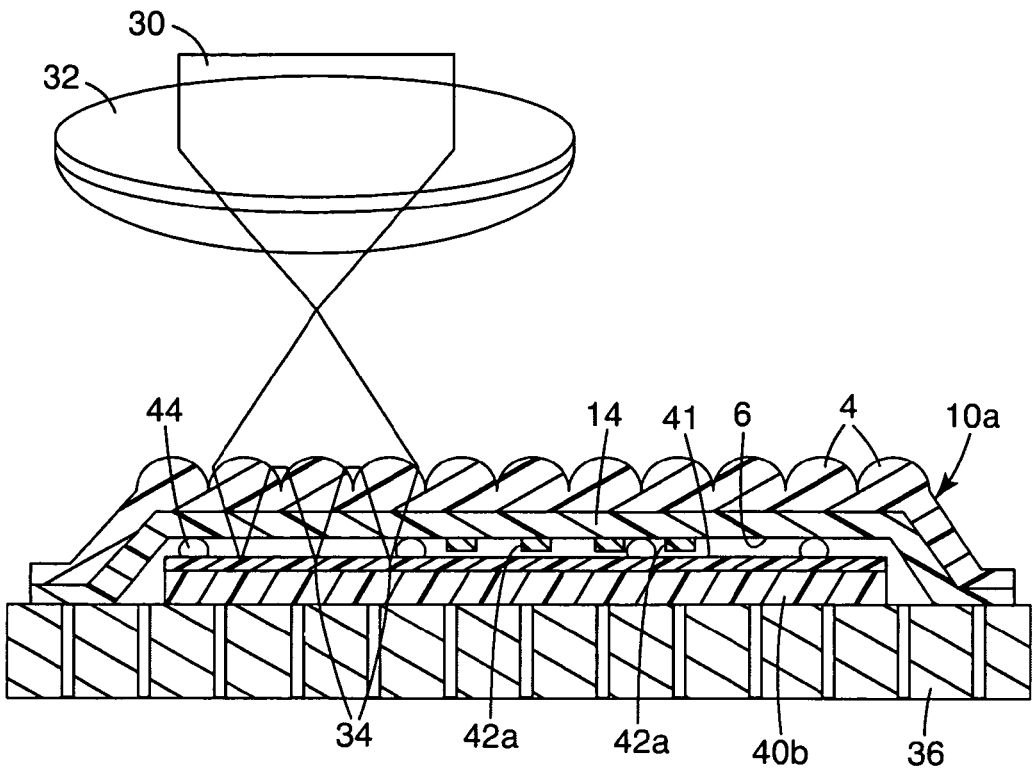
FIGS. 5a and 5b schematically illustrate another embodiment of the method illustrated in FIG. 4, except using a second donor sheet.
Figure 5B:
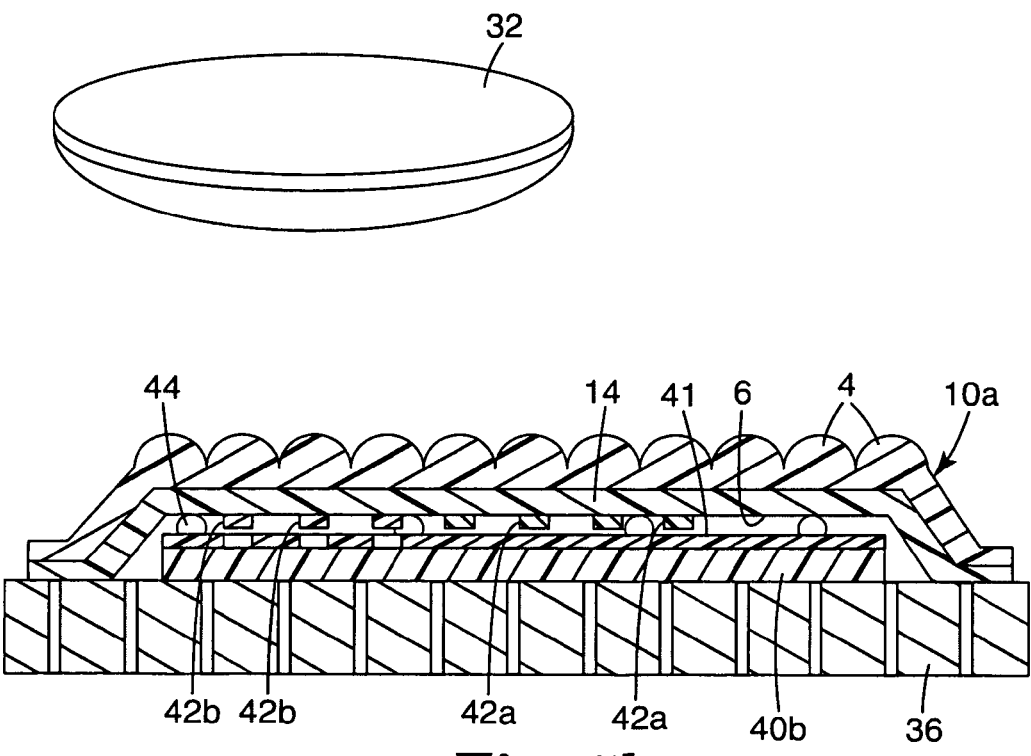

In FIG. 4b, a first donor substrate 40a is used to create individual partially complete images of donor material 42a on the sheeting 10. After the sheeting 10 has been imaged using the first donor substrate 40a, the first donor substrate 40a may be removed, and replaced with a second donor substrate 40b, as illustrated in FIG. 5a. The method described above and illustrated in FIGS. 4a and 4b is then repeated as illustrated in FIGS. 5a and 5b, respectively. The second donor substrate 40b is used to create images of donor material 42b on the sheeting 10. In one embodiment, the second donor substrate 40b includes a colorant that is different from the colorant in the first donor substrate 40a. This allows a user to form a composite image that consists of two different colors. That is, the composite image is multicolored, or has portions that are one color and portions that are a different color. Alternatively, the first and second donor substrates 40a, 40b, could be used to form two separate differently colored composite floating images, for example, as illustrated in FIG. 8. Alternatively, the colorants from the first and second donor substrates 40a, 40b may result in a composite image formed from the mixture of the two colorants. In another embodiment, the colorants in the first and second donor substrates 40a, 40b could include the same colorant. Any number of donor substrates 40 may be used to image the microlens sheeting 10 to form any number of floating composite images in a variety of different color combinations on a single sheeting 10.

Figure 6:
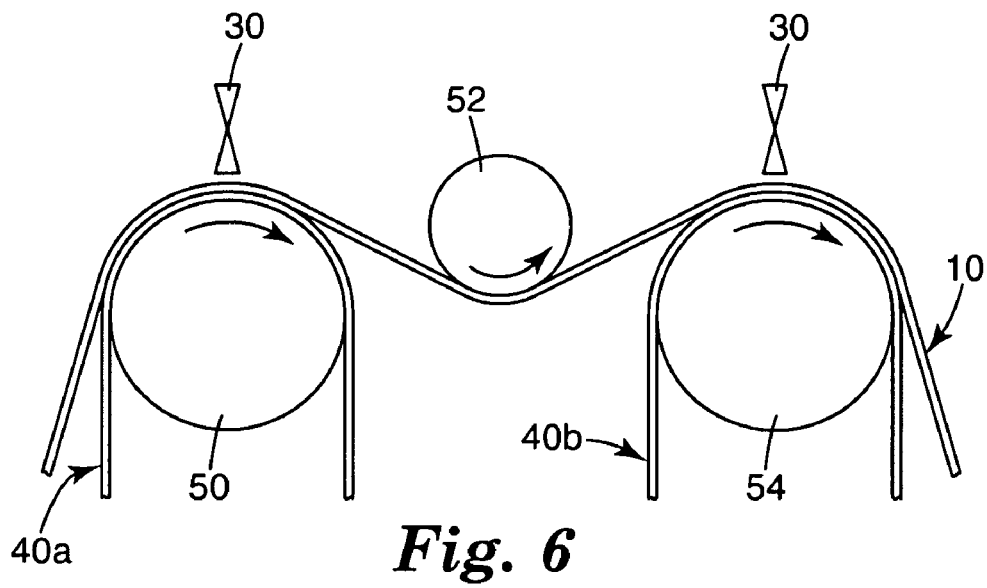
FIG. 6 schematically illustrates an apparatus for use with another embodiment of the methods illustrated in FIGS. 4 and 5.

FIG. 6 illustrates one embodiment of a roll-to-roll apparatus, which is convenient for imaging the microlens sheeting 10 with a first donor substrate 40a and then imaging the microlens sheeting 10 with a second donor substrate 40b. The apparatus includes a first roll 50, a second roll 54, and an idle roll 52. Stationed above each roll 50, 54 is a radiation source 30 with an appropriate optical train, as described above. The first donor material 40a wraps around the first roll 50, and the second donor material 40b wraps around the second roll 54. As the microlens sheeting 10 moves through the apparatus, it first is pressed against the first donor substrate 40a and roll 50, as it is imaged by the radiation source 30 in the same manner as described above in reference to FIGS. 4a and 4b. Next, the sheeting 10 moves from the first roll 50 and consequently, away from the first donor material 40a. Next, the microlens sheeting 10 continues moving around the idle roll 52 and is pressed against the second donor substrate 40b and roll 54, as it is imaged by the radiation source 30 in the same manner as described above in reference to FIGS. 5a and 5b. The microlens sheeting 10 is pulled from the second roll 54 and consequently, away from the second donor material 40b. The resulting microlens sheeting 10 will have donor materials from both the first and second donor substrates 40a, 40b imaged onto the first side 6 of the layer of material 14 of the microlens sheeting 10. The apparatus may include any number of rolls and radiation sources for depositing donor material from multiple donor substrates 40 onto the microlens sheeting 10 to form multiple composite floating images on the sheeting 10.

Figure 7:
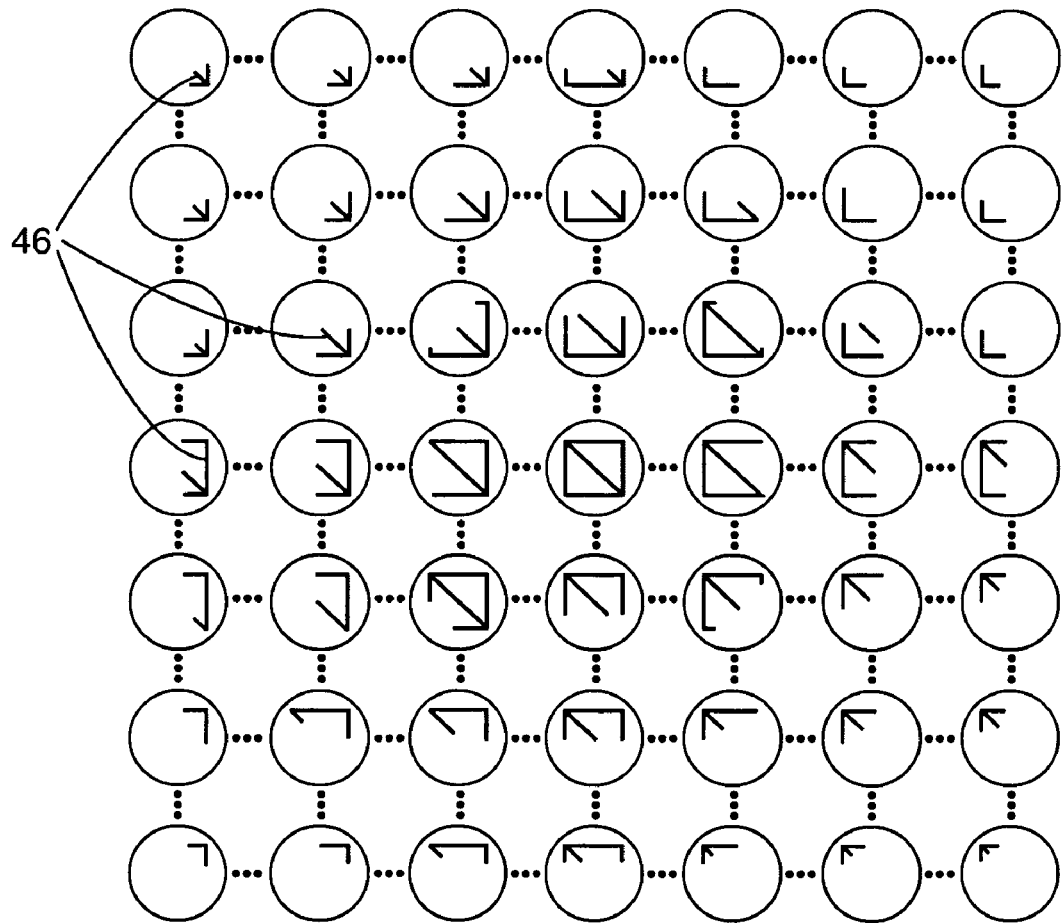
FIG. 7 is a plan view of a section of a microlens sheeting depicting sample images recorded in the material layer associated with individual microlenses made by the method of the present invention, and further showing that the recorded images range from complete replication to partial replication of the composite image.

FIG. 7 is a perspective view of a section of a microlens sheeting 10 depicting sample individual, partially complete images 46 formed by the radiation sensitive donor material 42 on the material layer 14 adjacent to individual microsphere 4 as viewed from the microlensed side of the microlensed sheeting, and further showing that the recorded images range from complete replication to partial replication.

Figure 9:
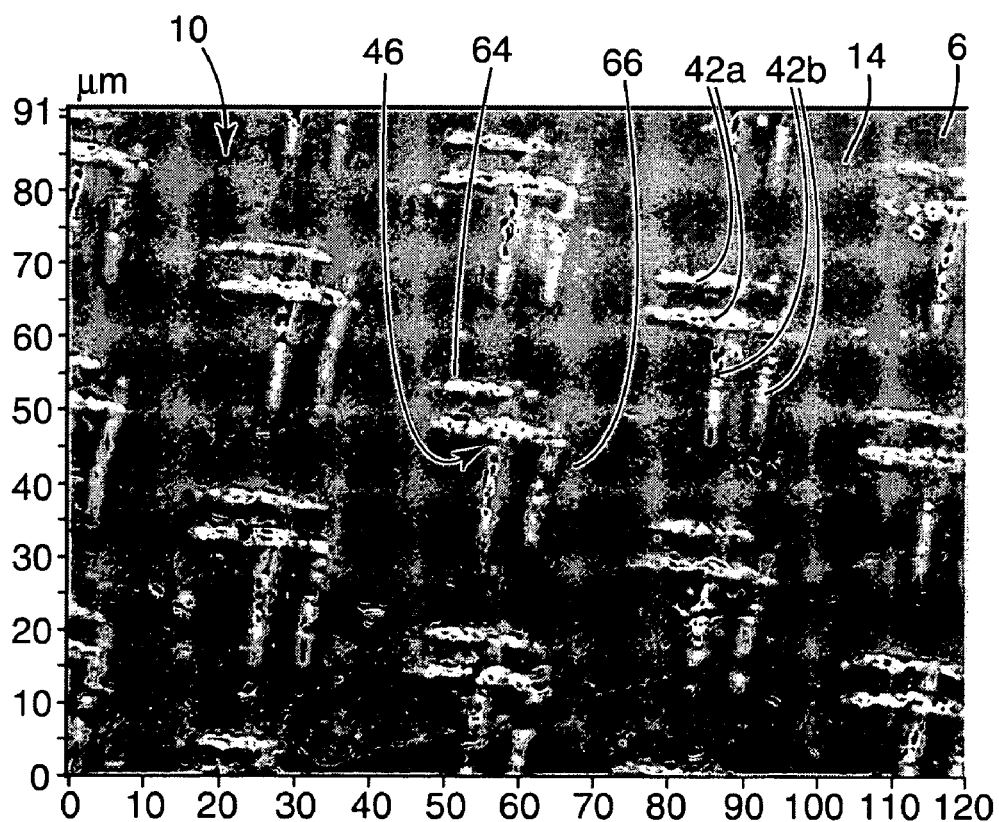
FIG. 9 is a photomicrograph of a portion of the backside of the microlens sheeting of FIG. 8 that has been imaged by one embodiment of the method in accordance with the present invention, illustrating individual, partially complete images; which viewed together through the microlenses provide a composite image that appears to float above or below the sheeting in accordance with the present invention.

FIGS. 8 and 9 show a microlens sheeting 10 imaged according to one embodiment of the method of this invention, using two radiation sensitive donor substrates 40 to create multiple composite images of different colors. FIG. 9 is a magnified optical profile of the first side 6 of material layer 14 on sheeting 10 shown in FIG. 8. The sheeting 10 includes a first composite image 60a that floats below the sheeting that appears as a double circle in the color of black and a second composite image 60b of a "3M" outline, also in the same color of black located inside the double circle, that floats above the sheeting. The sheeting 10 also includes a third composite image 60c that floats below the sheeting that appears as a double circle in the color of purple and a fourth composite image 60d of a "3M" outline, also in the same color of purple located inside the double circle, that floats above the sheeting. The sheeting 10 was imaged with a first donor substrate having colorants of black. The sheeting 10 was then imaged with a second donor substrate having colorants of purple.

A portion of the section A that is indicated in FIG. 8 corresponds to the bottom view of sheeting 10 (i.e., first side 6 of material layer 14) in FIG. 9. Specifically, FIG. 9 illustrates a magnified view of the individual, partially complete images 46 that together provide the intersection of the black and purple double circles of composite images 60a and 60c that appear to float below the sheeting in accordance with the present invention; (indicated in section A of FIG. 8).

The image 46 has two portions, a first portion 64 of black donor material 42a, and a second portion 66 of purple donor material 42b. Each image 46 corresponds generally to an individual microlens. The images 46 in FIG. 9 range in size from 24.5 to 27 um, however a range of other sizes are possible. FIG. 9 is convenient for illustrating the elevation of the donor materials above the surface of the material layer 14, as well as the impact upon the elevation level of the material layer 14 immediately adjacent the transferred donor material 42. The dark portions around the portions 64, 66 of the donor materials 42a, 42b indicate that the material layer 14 around those portions has been melted or its temperature was raised past it's glass transition temperature, and as a result, its associated elevation is 0.1-0.2 um below the plane of the first side 6 of material layer 14. These "divots" are created around the donor materials 42a, 42b as a result of the method of making, and possibly may serve to help enhance the image 60. The overall height of the donor material 42a, 42b ranges from approximately 0.1 to 0.75 um above the plane of the first side 6 of material 14 of the sheeting 10, however a range of other heights are possible.

These composite floating images 60 can also be thought of as the result of the summing together of many images 46, all with different perspectives of a real object. The many unique images are formed through an array of miniature lenses, all of which "see" the object or image from a different vantage point. Behind the individual miniature lenses, a perspective of the image is created by the donor material on the material layer that depends on the shape of the image and the direction from which the imaging energy source was received. In some embodiments of the method of the present invention, only that portion of the image or object seen by the lens that has sufficient energy to result in the transfer of some of the radiation sensitive donor material will be recorded. Portions of the image or object that correlate to the lens being exposed to a correspondingly greater energy level may generally result in a greater amount of donor material being transferred, i.e. may result in images 46 that have a greater elevation above the first side 6 of the material layer 14 of the sheeting 10.

The "object" to be imaged is formed through the use of an intense light source by either tracing the outline of the "object" or by the use of a mask. For the image thus recorded to have a composite aspect, the light from the object must radiate over a broad range of angles. When the radiation from an object is coming from a single point of the object and is radiating over a broad range of angles, all the radiation rays are carrying information about the object, but only from that single point, though the information is from the perspective of the angle of the radiation ray. Now consider that in order to have relatively complete information about the object, as carried by the radiation rays, light must radiate over a broad range of angles from the collection of points that constitute the object. In this invention, the range of angles of the radiation rays emanating from an object is controlled by optical elements interposed between the radiation source and the microlens sheeting. These optical elements are chosen to give the optimum range of angles necessary to produce a composite image. The best selection of optical elements results in a cone of radiation whereby the vertex of the cone terminates at the position of the object.

Geometric optics will be used to describe the formation of various composite images according to the present invention. As noted previously, the imaging processes described below are preferred, but not exclusive, embodiments of the invention.

As noted above, a preferred manner of providing the image patterns on the layer of material adjacent the microlenses is to use a radiation source to transfer a radiation sensitive donor material which is placed adjacent the material layer of the microlens sheeting to form an image on the material layer.

A. Creating a Composite Image That Floats Above the Sheeting

Figure 10:
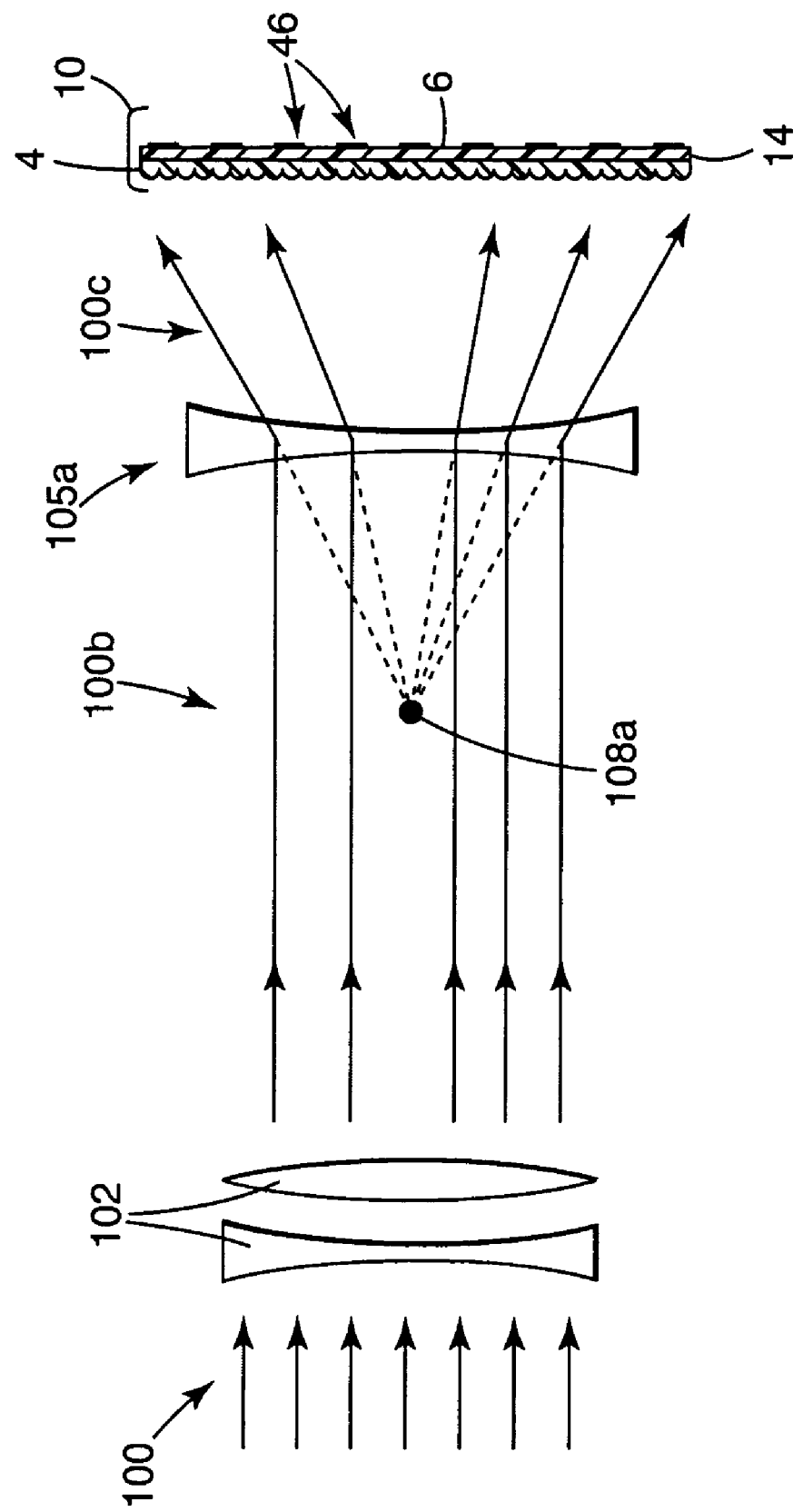
FIG. 10 is a geometrical optical representation of the formation of a composite image that appears to float above the microlens sheeting.

Referring to FIG. 10, incident radiation 100 (light, in this example) is directed and collimated by optics 102 that directs the light 100*b* towards a diverging lens 105*a*. From the diverging lens, the light rays 100*c* diverge toward the microlens sheeting 10.

The energy of the light rays impinging upon the microlens sheeting 10 is focused by the individual microlenses 4 approximately at the interface between the material layer 14 and a donor substrate (not shown). This focused radiation results in the transfer of at least a portion of the radiation sensitive material and/or the colorant in the donor substrate to provide images 46 on the surface 6 of material layer 14, the size, shape, and appearance of which depends on the interaction between the light rays, the microlenses, and the radiation sensitive donor substrate.

The arrangement shown in FIG. 11 would provide a sheeting having a composite image that appears to an observer to float above the sheeting as described below, because diverging rays 100*c*, if extended backward through the lens, would intersect at the focal point 108*a* of the diverging lens. Stated differently, if a hypothetical "image ray" were traced from the material layer through each of the microlenses and back through the diverging lens, they would meet at 108*a*, which is where a portion of the composite image appears.

B. Viewing a Composite Image That Floats Above the Sheeting

A sheeting that has a composite image may be viewed using light that impinges on the sheeting from the same side as the observer (reflected light), or from the opposite side of the sheeting as the observer (transmitted light), or both. FIG. 11 is a schematic representation of a composite image that appears to the unaided eye of an observer A to float above the sheeting when viewed under reflected light. An unaided eye may be corrected to normal vision, but is not otherwise assisted by, for example, magnification or a special viewer. When the imaged sheeting is illuminated by reflected light, which may be collimated or diffuse, light rays are reflected back from the imaged sheeting in a manner determined by the donor material 42 in the individual images 46 struck by the light rays. By definition, the images formed by the donor material 42 appear different than the non-imaged portions of the material layer 14 where no donor material 42 is present, and thus an image can be perceived.

For example, portions (e.g. a specific wavelength range) of the light L1 may be reflected by the donor material 42 back toward the observer, the summation of which creates a colored composite image that appears to float above the sheeting, a portion of which is shown at 108*a*. In short, specific portions of the visible electromagnetic spectrum can be reflected from the imaged portions 46 or reflected from a laminate substrate such as a passport (not shown) and absorbed or scattered by imaged portions 46, which means that a portion of a colored composite image will be apparent at 108*a*. However, the donor material 42 may not reflect light L2 back toward the observer well, or at all, or it may significantly absorb light reflected from a laminate surface and subsequently transmitted through the donor material 42. Thus, the observer may detect the absence of light rays at 108*a*, the summation of which creates a black composite image that appears to float above the sheeting, a portion of which appears at 108*a*. In short, light may be partially reflected from the entire sheeting or highly reflected from a laminate behind the sheeting except the imaged portions 46, which means that a relatively dark composite image will be apparent at 108*a*.

It is also possible that the imaged material 42 would reflect or partially absorb incident light, and a dark laminate (not shown) placed adjacent to the imaged portions 46 would absorb the light to provide the contrast effect required to provide a composite image. The composite image under those circumstances would appear as a relatively bright composite image in comparison to the remainder of the sheeting with laminate (not shown), which would appear relatively dark. Various combinations of these possibilities can be selected as desired.

Figure 12:
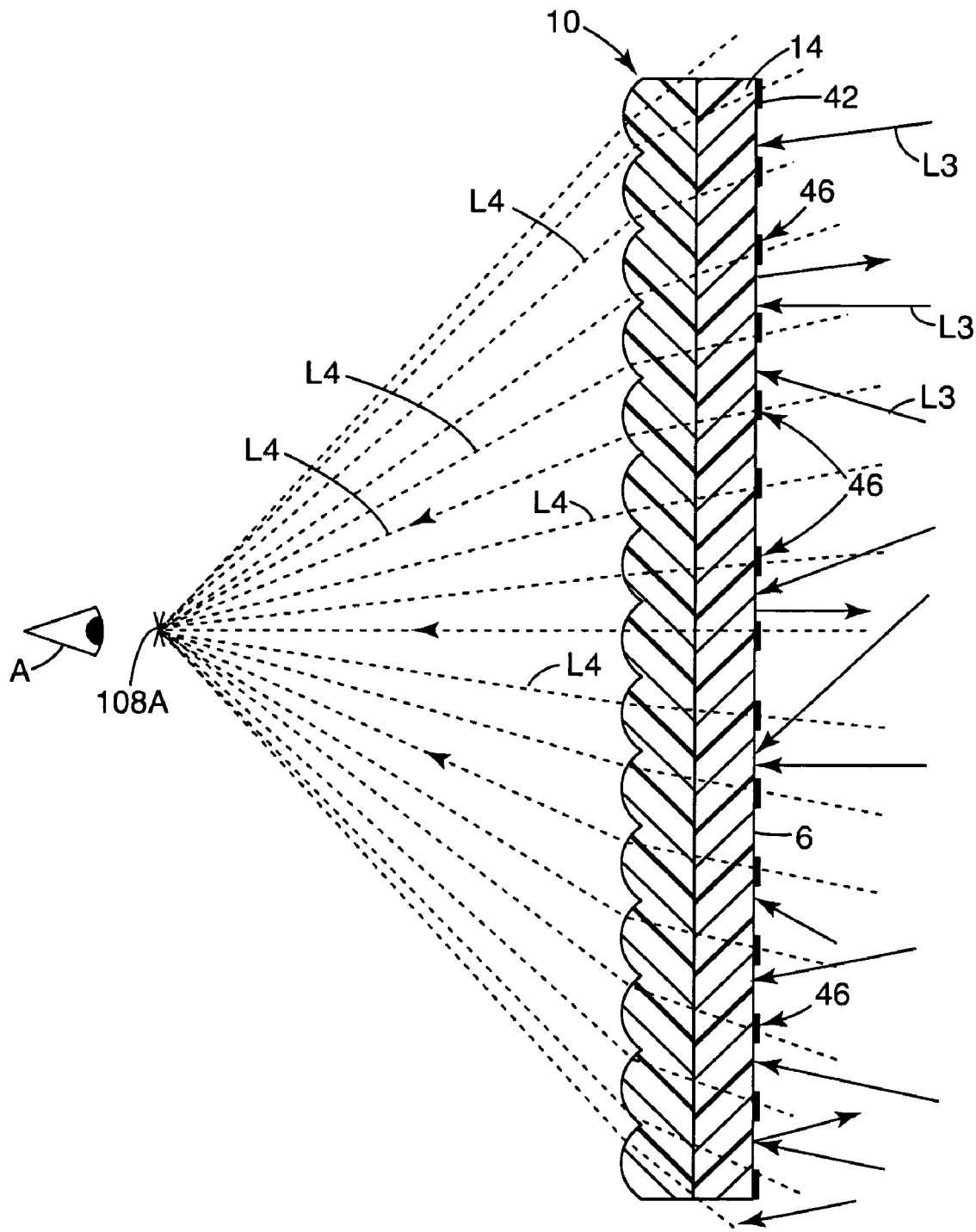
FIG. 12 is a schematic representation of a sheeting having a composite image that appears to float above the inventive sheeting when the sheeting is viewed in transmitted light.

Certain imaged sheetings can also be viewed by transmitted light, as shown in FIG. 12. For example, when the imaged portions of the donor material 42 on the material layer 14 are translucent and absorb portions of the visible spectrum, and the nonimaged portions are transparent or translucent, but highly transmissive, then some light L3 will be selectively absorbed or reflected by the donor material 42, and directed by the microlenses toward the focal point 108*a*. The composite image will be apparent at the focal point, where it will, in this example, appear darker and colored compared to the remainder of the sheeting.

C. Creating a Composite Image That Floats Below The Sheeting

Figure 13:
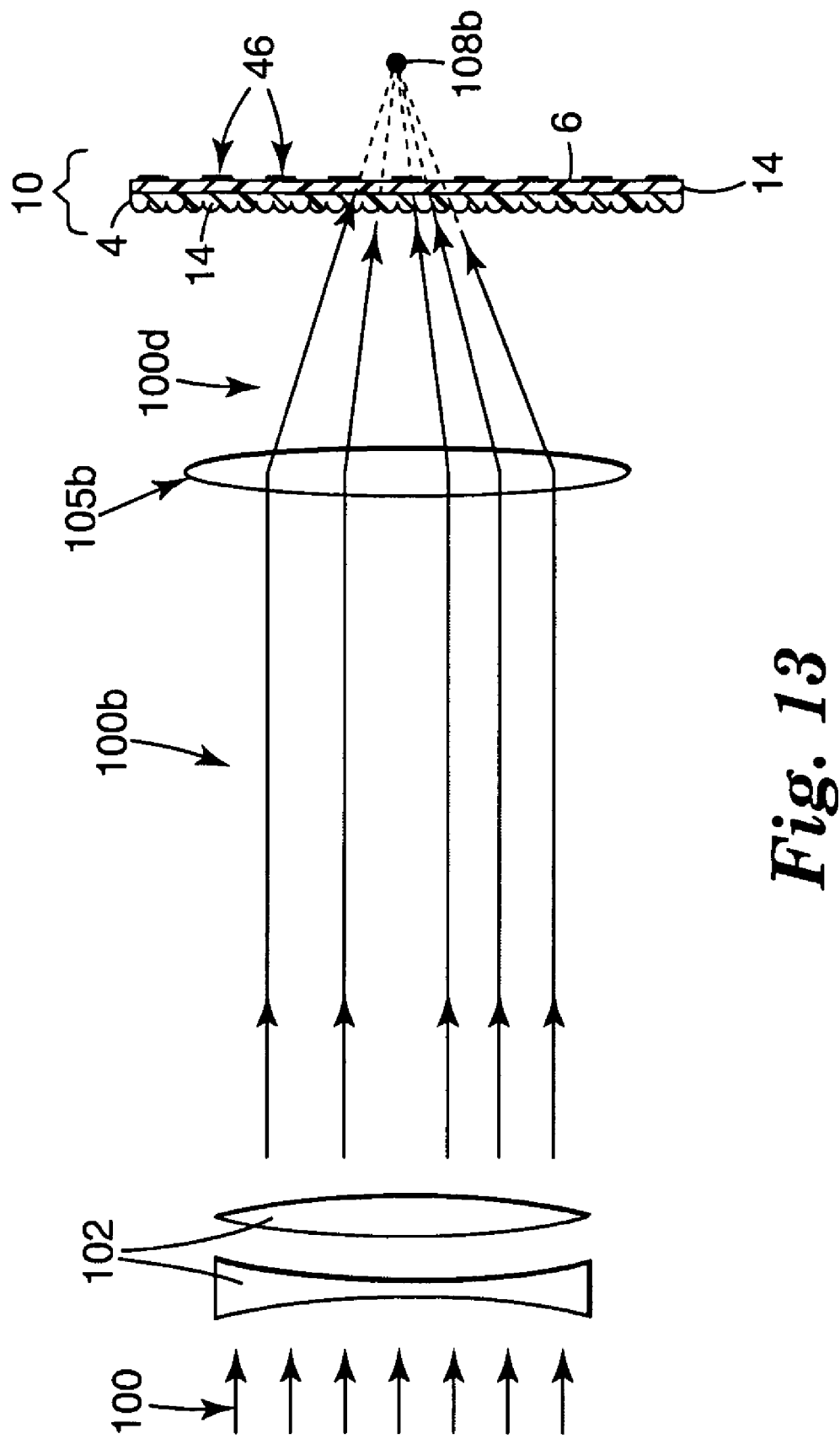
FIG. 13 is a geometrical optical representation of the formation of a composite image that when viewed will appear to float below the microlens sheeting.

A composite image may also be provided that appears to be suspended on the opposite side of the sheeting from the observer. This floating image that floats below the sheeting can be created by using a converging lens instead of the diverging lens 105 shown in FIG. 10. Referring to FIG. 13, the incident energy 100 (light, in this example) is directed and collimated in a collimator 102 that directs the light 100*b* toward a converging lens 105*b*. From the converging lens, the light rays 100*d* are incident on the microlens sheeting 10, which is placed between the converging lens and the focal point 108*b* of the converging lens.

The energy of the light rays impinging upon the microlens sheeting 10 is focused by the individual microlenses 4 approximately into the interface area between the material layer 14 and a radiation sensitive donor substrate (not shown). This focused radiation transfers a portion of the radiation sensitive material in the donor substrate to provide images 46 made from the donor material 42, the size, shape, and appearance of which depends on the interaction between the light rays, the microlenses sheeting, and the donor substrate. The arrangement shown in FIG. 13 would provide a sheeting 10 having a composite image that appears to an observer to float below the sheeting as described below, because converging rays 100d, if extended through the sheeting, would intersect at the focal point 108b of the diverging lens. Stated differently, if a hypothetical "image ray" were traced from the converging lens 105b, through each of the microlens and through the images on the material layer formed from the donor material 42 associated with each microlens, they would meet at 108b, which is where a portion of the composite image appears.

D. Viewing a Composite Image That Floats Below the Sheeting

Figure 14:
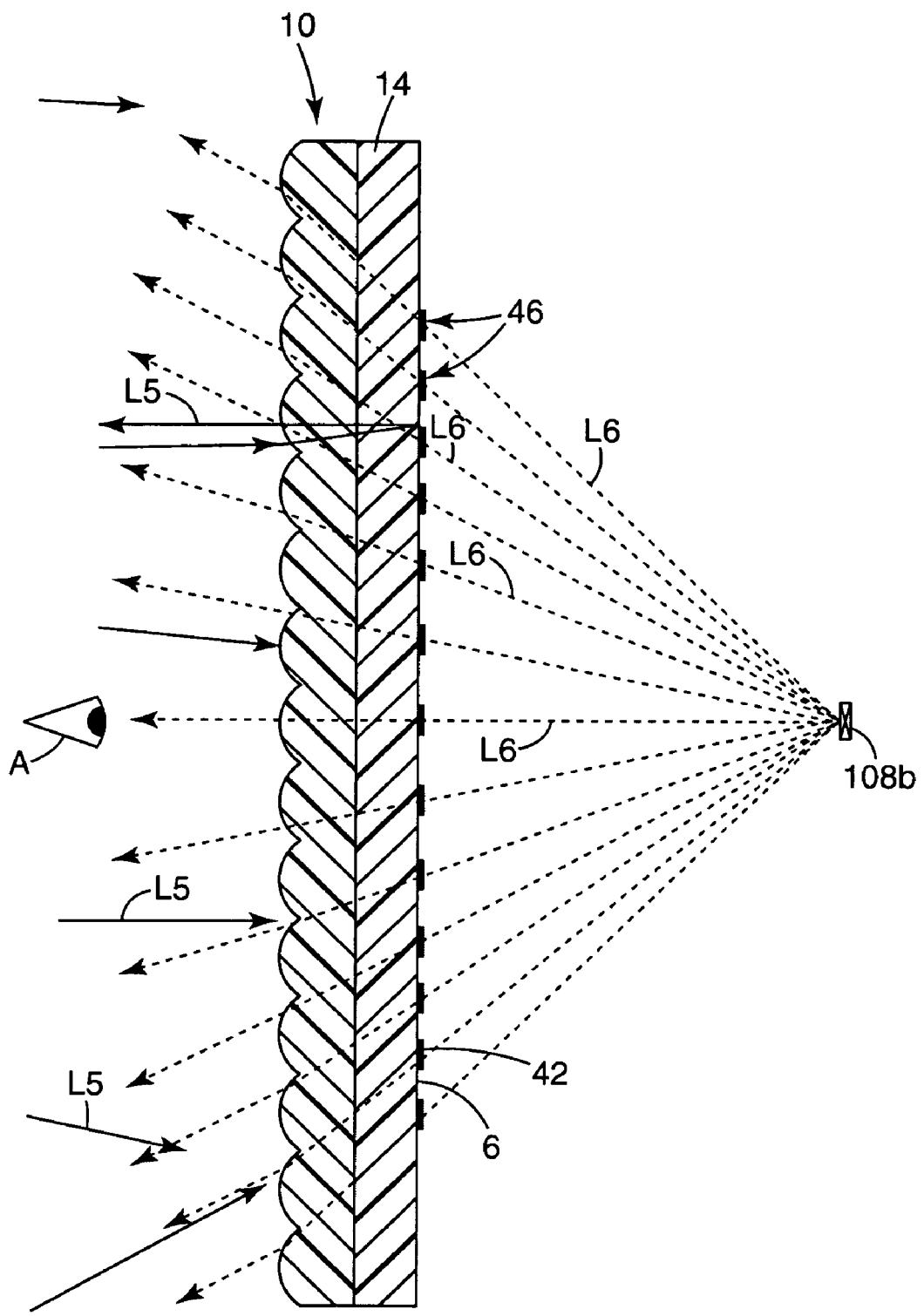
FIG. 14 is a schematic representation of a sheeting having a composite image that appears to float below the inventive sheeting when the sheeting is viewed in reflected light.

Sheeting having a composite image that appears to float below the sheeting can also be viewed in reflected light, transmitted light, or both. FIG. 14 is a schematic representation of a composite image that appears to float below the sheeting when viewed under reflected light. For example, portions of the visible spectrum of light L5 may be reflected by the donor material 42 on the material layer 14 back toward the observer. Thus, the observer may detect the presence of colored light rays which appear to originate from 108b, the summation of which creates a colored composite image that appears to float below the sheeting, a portion of which appears at 108b. In short, light may be reflected primarily from the imaged portions 46, which means that a darker colored composite image will be apparent at 108b. Alternatively, the incident light may be reflected by a laminate behind the material layer, portions of which are subsequently absorbed or scattered by the donor material 42, and travel back toward the observer. Thus, the observer may detect the presence of colored light rays which appear to originate from 108b, the summation of which creates a colored composite image. In short, light may be reflected from a laminate behind the material layer and absorbed by imaged portions 46, which means that a darker colored composite image will be apparent at 108b.

It is also possible that the laminate behind the material layer would absorb incident light, and that the donor material 42 would reflect or partially absorb incident light, respectively, to provide the contrast effect required to provide a composite image. The composite image under those circumstances would appear as a relatively bright composite image in comparison to the remainder of the sheeting, which would appear relatively dark. Various combinations of these possibilities can be selected as desired.

Figure 15:
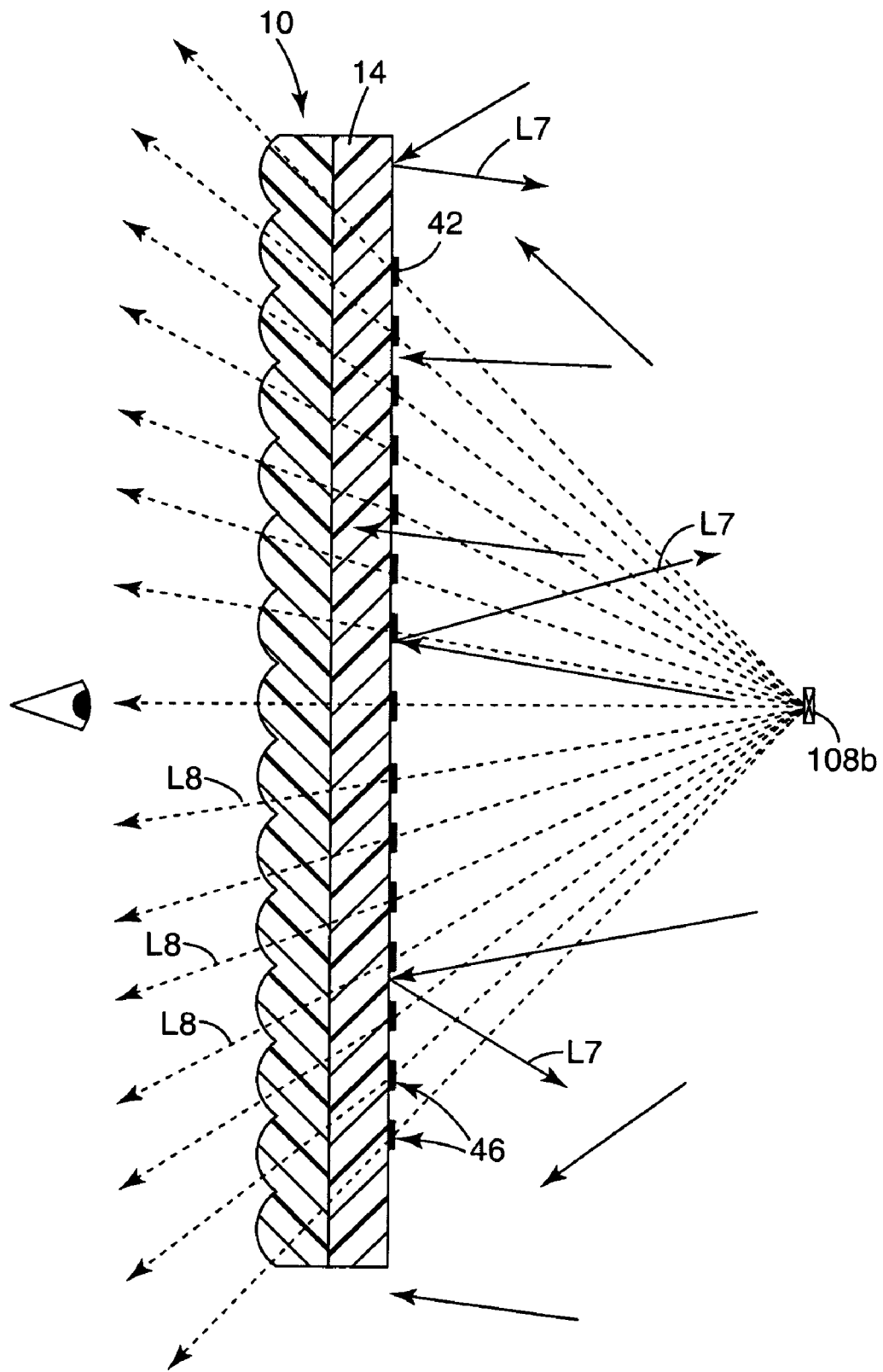
FIG. 15 is a schematic representation of a sheeting having a composite image that appears to float below the inventive sheeting when the sheeting is viewed in transmitted light.

Certain imaged sheetings can also be viewed by transmitted light, as shown in FIG. 15. For example, when the imaged portions on the material layer 14 of donor material 42 are translucent and color absorbing and the nonimaged portions where no donor material 42 is present are transparent, then specific portions of the visible spectrum of light L7 will be absorbed or reflected by the donor material 42, while transmitted light L8 will be passed through the remaining portions on the material layer. The extension of those rays, referred to herein as "image rays," back in the direction of the incident light results in the formation of a composite image, a portion of which appears at 108b. The composite image will be apparent at the focal point, where, it will, in this example, appear darker and colored while the sheeting appears transparent.

Alternatively, if the imaged portions of donor material 42 on the material layer 14 are not translucent but the remainder of the material layer 14 is, then the absence of transmitted light in the areas of the images will provide a composite image that appears darker than the remainder of the sheeting.

Figure 11:
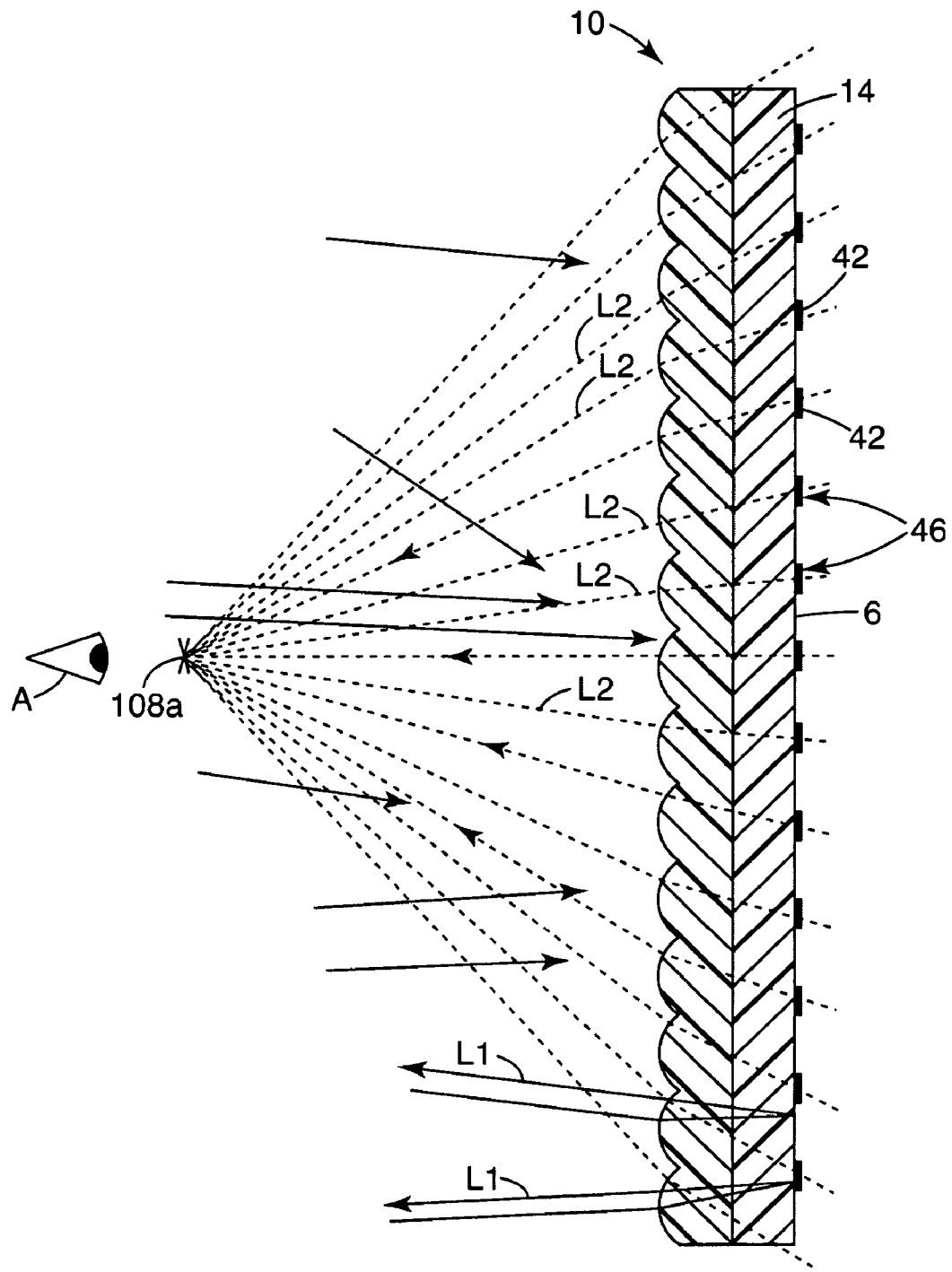
FIG. 11 is a schematic representation of a sheeting having a composite image that appears to float above the inventive sheeting when the sheeting is viewed in reflected light.
Figure 16:
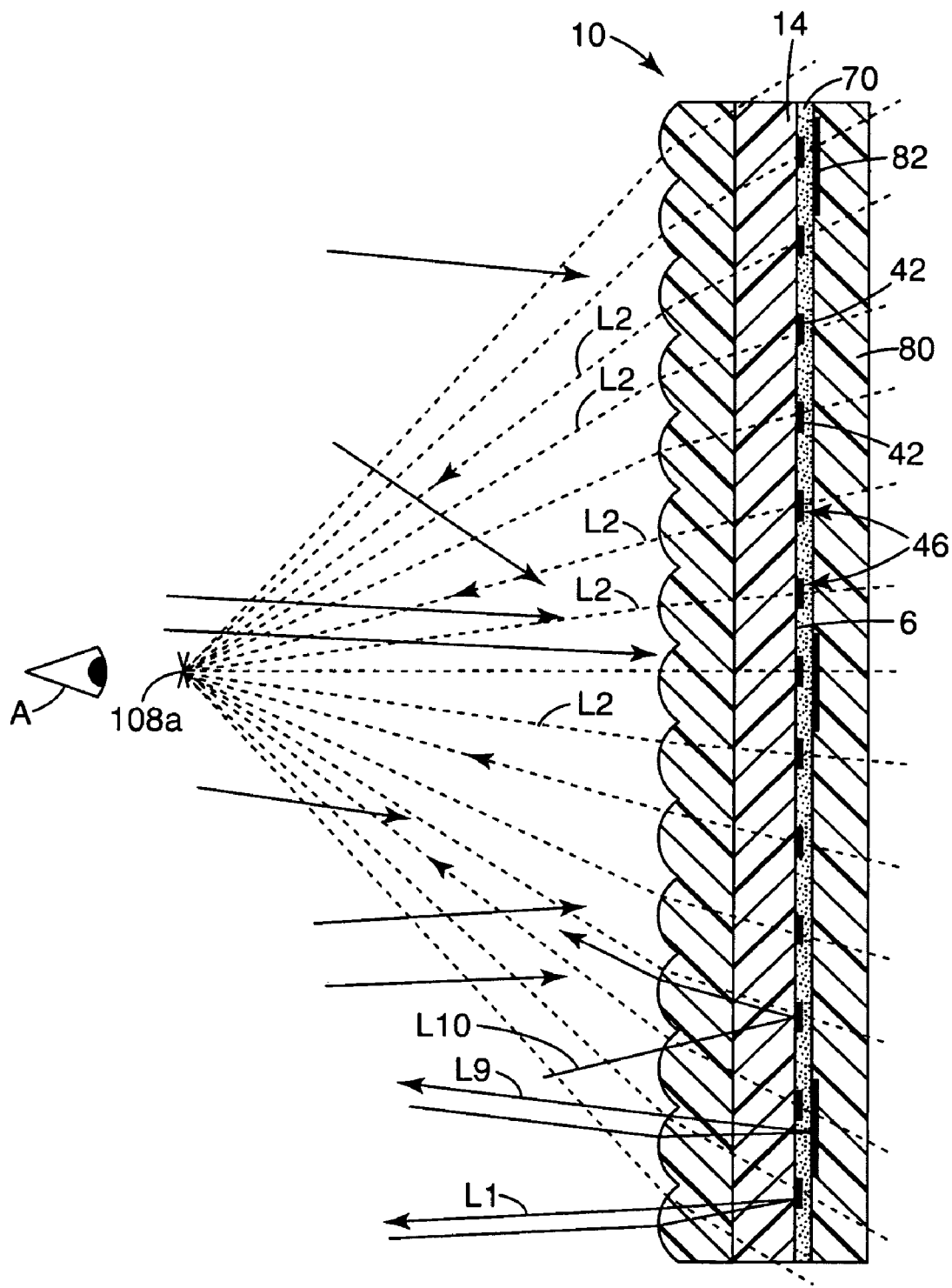
FIG. 16 illustrates one embodiment of the sheeting of the present invention attached to a substrate.

FIG. 16 illustrates the sheeting 10 of FIG. 11 adhered to a substrate or laminate 80. The sheeting 10 may be attached to substrate 80 by a layer of adhesive 70, as illustrated. Alternatively, the sheeting 10 may be integrally formed or embedded into substrate 80. The substrate 80 could be a document, a sign, an identification card, a container, currency, a display, a credit card, or any other form of substrates. The sheeting 10 attached to the substrate 80 could be used for advertising, decoration, authentication, identification purposes, or for any other intended purpose. The substrate 80 may include additional information 82, which may be printed on the substrate 80, which may also be viewable by an observer in addition to the composite image 108a. For example, portions (e.g. a specific wavelength range) of the light L9 may be reflected by the substrate 80 back toward the observer. Light L10 may be reflected off the transferred donor material 42 making the composite image visible to the viewer, along with the embedded or covered graphics 82. The substrate 80 may be translucent, or opaque, or any combination thereof. In another embodiment, the microlens sheeting 10 may include portions with microlens 4 and portions without microlenses. The portion without microlenses may be a window for viewing other portions of the microlens sheeting 10 or for viewing portions of a substrate that the microlens sheeting is attached to. Alternatively, the window could include microlenses and the portion around the microlenses may not include microlenses.

Composite images made in accordance with the principles of the present invention may appear to be either two-dimensional, meaning that they have a length and width, and appear either below, or in the plane of, or above the sheeting, or three-dimensional, meaning that they have a length, width, and height. Three-dimensional composite images may appear below or above the sheeting only, or in any combination of below, in the plane of, and above the sheeting, as desired. The term "in the plane of the sheeting" refers only generally to the plane of the sheeting when the sheeting is laid flat. That is, sheeting that isn't flat can also have composite images that appear to be at least in part "in the plane of the sheeting" as that phrase is used herein.

Three-dimensional composite images do not appear at a single focal point, but rather as a composite of images having a continuum of, or discrete focal points, with the focal points ranging from one side of the sheeting to or through the sheeting to a point on the other side. This is preferably achieved by sequentially moving either the sheeting or the radiation source relative to the other (rather than by providing multiple different lenses) so as to transfer the donor material adjacent the material layer at multiple focal points to produce images 46 on the surface 6 of material layer 14. The resulting spatially complex image essentially consists of many individual dots. This image can have a spatial extent in any of the three Cartesian coordinates relative to the plane of the sheeting.

In another type of effect, a composite image can be made to move into a region of the microlensed sheeting where it disappears. This type of image is fabricated in a fashion analogous to the floating image examples with the addition of placing an opaque mask in front of the microlensed materials to partially block the imaging light for part of the microlensed material. When viewing such an image, the image can be made to move into the region where the imaging light was either reduced or eliminated by the contact mask. The image seems to "disappear" in that region.

In another type of effect, a composite image can be made to change color as viewing angle is changed. This type of image is fabricated in one of several ways, such as blocking an angular portion of the imaging radiation cone for the first donor. The same virtual image is then re-imaged with a second donor with a different colorant, blocking only the portion of the previously unblocked cone.

Images formed by the process of this invention can also be constructed that have a restricted viewing angle. In other words, the image would only be seen if viewed from a particular direction, or minor angular variations of that direction.

This invention will be further explained by the following Examples. The Examples used optical train apparatuses for creating the composite images of this invention which were essentially similar to the optical train apparatuses described in reference to FIGS. 14 and 16 of U.S. Pat. No. 6,288,842 (Florczak et al.). The entire disclosure of U.S. Pat. No. 6,288,842 (Florczak et al.) is hereby incorporated by reference.

EXAMPLES

For the Examples, two donor substrates of different color were prepared—cyan and carbon black. First, color solutions were prepared and then, the color solutions were coated onto a substrate thereby forming the donor substrates.

The cyan coating solution was prepared as follows. A solution of 0.05 grams of near Infrared (IR) dye with absorbance peak at 801 nanometers, commercially available from H. W. Sands Company, Jupiter, Fla., under product number SDB 1217, in 1 gram of 2-butanone available from Sigma-Aldrich Company, St. Louis, Mo., and 1 gram of 1-methyl-2-pyrrolidone available from Sigma-Aldrich Company, St. Louis, Mo., was added to 2 grams of a dispersion of phthalocyanine blue pigment (Pigment Blue 15:4) in propylene glycol methyl ether, commercially available from Penn Color, Inc., Doylestown, Pa., under product number 16S1206D. This prepared solution was placed in a 4 dram glass vial and mixed for approximately five minutes on a roller.

The carbon black coating solution was prepared as follows. Four (4) grams of black polyvinyl butyral paste—a mixture of carbon black, methyl ethyl ketone and propylene glycol methyl ether, commercially available from Penn Color, Inc., Doylestown, Pa., under product number 16B919D was mixed with 1 gram of 1-methyl-2-pyrrolidone available from Sigma-Aldrich Company, St. Louis, Mo. This prepared solution was placed in a 4 dram glass vial and mixed for approximately five minutes on a roller.

The donor substrates were prepared as follows. A 50 micron thick sheet of polyethylene terathalate (PET)—a transparent polymeric material, measuring 15.24 centimeters by 25.4 centimeters, was placed on top of a glass coating surface and cleaned with 2-propanol, commercially available from Sigma-Aldrich Company, St. Louis, Mo. and a standard clean room wipe. The surface of the PET sheet was wiped with the clean room wipe until the surface of the PET sheet was dry. Then, the cyan coating solution was coated onto the PET sheet using a Meier bar 20.3 centimeters long and 12.7 millimeters in diameter, wound over the central 15.24 centimeter section of the bar with 8 mil wire, followed by drying in an oven at 80 degrees Celsius for 30 seconds. This process was repeated using the cyan coating solution and the black coating solution individually, thusly producing a number of cyan and black donor substrate sheets.

To complete the material layers needed, sheeting with an array of microlens was produced. An array of acrylate lenses were replicated onto a 50 micron thick sheet of PET, the PET sheet surface treated to enable bonding with acrylate. The resulting sheeting was approximately 58 microns thick. The replicated lenses had an 18.7 micron radius of curvature and a negative 0.745 conic constant. The diameter of each lens formed at the surface of the acrylate was 30 microns, with a center-to-center lens distance of 34 microns.

Example 1

This example describes a microlensed sheeting with a two-dimensional composite image that appeared to float below the sheeting and a second composite image that was three-dimensional that appeared to float above the sheeting. An optical train of the type depicted in FIG. 16 was used to form the floating images. Imaging, except for the variations described in the optical train below and the mass transfer method described above, was done in accord with the imaging methods taught in U.S. Pat. No. 6,288,842.

The optical train consisted of a Spectra Physics (Mountain View, Calif.) Hurricane™ Ti-Sapphire Ultrafast Laser operating at its fundamental wavelength of 800 nanometers and at an output power of 45 milliwatts measured at a position of 6.35 millimeters above the microlensed sheeting. The pulse width was approximately 120 femtoseconds and the pulse repetition rate was 250 Hz. A diffuser was not employed in the optical train of this example. A vacuum chuck with a rectangular outline of vacuum holes, the rectangular outline measuring 57.15 millimeters by 69.85 millimeters, was located on the XY plane of the XYZ stage with the vacuum holes perpendicular to the XY plane.

Donor substrate sections of both cyan and carbon black were prepared by cutting the respective donor substrate into rectangular segments measuring approximately 50.8 millimeters by 63.5 millimeters. A segment of the carbon black donor substrate with the carbon black coated side of the substrate facing away from the vacuum chuck was center positioned relative to the rectangular pattern of vacuum holes in the vacuum chuck. Next, a segment of the microlensed sheeting was cut to a size large enough so that it overlapped the vacuum holes of the vacuum chuck, i.e. the microlensed sheeting was cut to a size larger than 57.15 millimeters by 69.85 millimeters. The segment of microlensed sheeting was then positioned on top of the donor substrate on top of the vacuum chuck with the lensed side of the microlensed sheeting facing away from the vacuum chuck. A vacuum was then pulled on the vacuum chuck. Tape was then positioned along one edge of the microlensed sheeting segment.

A composite image was then created onto the material layer of the microlensed sheeting according to the imaging techniques of the U.S. Pat. No. 6,288,842 and the material transfer techniques described above to create, upon viewing the image from the microlens side of the microlensed sheeting, an oval image with long axis of approximately 16.5 millimeters and short axis of approximately 11.4 millimeters, that appeared to float 6.25 millimeters below the surface of the microlensed sheeting. The vacuum to the vacuum chuck was then disengaged. The microlensed sheeting was lifted at an angle away from the surface of the vacuum chuck using the tape as a hinge point. The carbon black donor substrate segment was removed and a cyan donor substrate segment was positioned onto the vacuum chuck in the same manner that the carbon black donor substrate segment had been positioned. The microlensed sheeting was lowered back into position overlying the holes of the vacuum chuck and the vacuum was reengaged. A three-dimensional composite image was then imaged onto the material layer of the microlensed sheeting according to the imaging techniques of U.S. Pat. No. 6,288,842 and the material transfer techniques above described to create, upon viewing the image from the microlens side of the microlensed sheeting, a solid outline of a rectangular parallelepiped image with long sides of approximately 5.7 millimeters and short sides of approximately 5.2 millimeters, that appeared to be three-dimensional and float above the surface of the microlensed sheeting.

When the microlensed sheeting was viewed in ambient light, the oval image appeared 1) black in color, 2) to be two-dimensional and 3) to float below the surface of the microlensed sheeting, and the rectangular parallelepiped appeared 1) cyan in color, 2) to be three-dimensional and 3) to float above the surface of the microlensed sheeting. Moreover, the composite images displayed reasonably large movement in relation to an observer's viewing perspective, so an observer could easily view different aspects of the composite images depending upon the viewing angle. Further, as one changed viewing angle, the composite images were seen to move in relation to each other.

Example 2

This example describes a microlensed sheeting with a single color two-dimensional composite image that appeared to float below the sheeting and a second two-dimensional composite image comprised of two colors that appeared to float above the sheeting. An optical train of the type depicted in FIG. 16 was used to form the floating images. Imaging, except for the variations in the optical train described in EXAMPLE 1 and the mass transfer method described above, was done in accord with the imaging methods taught in U.S. Pat. No. 6,288,842.

Donor substrate sections of both cyan and carbon black and microlensed sheeting segments were prepared as set forth in EXAMPLE 1. The donor substrate sections and the microlensed sheeting were arranged on the vacuum chuck as described in EXAMPLE 1.

An image that would produce an oval two-dimensional composite image upon viewing was then imaged onto the material layer of the microlensed sheeting as set forth in EXAMPLE 1. Then an image that would produce a two-dimensional outline composite image of the number and alphabet "3M" in two colors upon viewing was imaged onto the material layer of the microlensed sheeting. Using the carbon black donor sheet that had been used to image the oval, various line segments of the "3M" were imaged in black. Following the procedure detailed in EXAMPLE 1, the vacuum to the vacuum chuck was then disengaged, the microlensed sheeting was lifted at an angle away from the surface of the vacuum chuck using the tape as a hinge point, the carbon black donor substrate segment was removed and a cyan donor substrate segment was positioned onto the vacuum chuck, the microlensed sheeting was lowered back into position overlying the holes of the vacuum chuck and the vacuum was reengaged. Then the line segments of the "3M" not imaged in black were imaged in cyan. The two-dimensional "3M" image was sized such that when the composite images were viewed at an angle normal to the images, the "3M" image fit into the long axis of the oval image. The two-dimensional "3M" was imaged so as to appear to float 6.35 millimeters above the surface of the microlensed sheeting.

When the microlensed sheeting was viewed in ambient light, the oval image appeared 1) black in color, 2) to be two-dimensional and 3) to float below the surface of the microlensed sheeting, and the "3M" image appeared 1) to have segments black in color with the remaining segments cyan in color, 2) to be two-dimensional, 3) to float above the surface of the microlensed sheeting and 4) to fit within the long axis of the oval image when viewed at an observation angle normal to the images. As in EXAMPLE 1, the composite images displayed reasonably large movement in relation to an observer's viewing perspective, so an observer could easily view different aspects of the composite images depending upon the viewing angle. Further, as one changed viewing angle, the composite images were seen to move in relation to each other.

Various modifications and combinations of the embodiments disclosed will be apparent to those skilled in the art, and those modifications are intended to be within the scope of the invention as defined in the appended claims.

We claim:

1. A sheeting comprising:
a plurality of microlenses;
a material layer adjacent the plurality of microlenses;
a first donor material in contact with the material layer, wherein the donor material forms individual, partially complete images on the material layer associated with each of a plurality of the microlenses, whereby the sheeting exhibits a composite image, provided by the individual images, that appears to the unaided eye to float above or below the sheeting, or both.

2. The sheeting of claim 1, wherein the composite image appears under reflected light to float above the sheeting.

3. The sheeting of claim 1, wherein the composite image appears in transmitted light to float above the sheeting.

4. The sheeting of claim 1, wherein the composite image appears under reflected light to float below the sheeting.

5. The sheeting of claim 1, wherein the composite image appears in transmitted light to float below the sheeting.

6. The sheeting of claim 1, wherein at least part of the composite image fluoresces and/or phosphoresces and appears to the unaided eye to float above or below the sheeting or both.

7. The sheeting of claim 1, wherein the composite image also appears to the unaided eye to be at least in part in the plane of the sheeting.

8. The sheeting of claim 1, wherein the first donor material comprises a colorant.

9. The sheeting of claim 8, wherein at least a portion of the composite image exhibits a color similar to the colorant in the donor material.

10. The sheeting of claim 1, wherein the donor material comprises radiation sensitive material.

11. The sheeting of claim 1, wherein the donor material comprises a metallic radiation sensitive material.

12. The sheeting of claim 1, wherein the donor material comprises a nonmetallic radiation sensitive material.

13. The sheeting of claim 1, wherein the sheeting is an exposed lens sheeting.

14. The sheeting of claim 1, wherein the sheeting is an embedded lens sheeting.

15. The sheeting of claim 1, wherein the composite image is perceptible across a viewing angle of less than one hundred fifty (150) degrees.

16. The sheeting of claim 1, wherein the composite image appears to move relative to the sheeting as the viewing position changes relative to the sheeting.

17. The sheeting of claim 1, wherein the composite image disappears and reappears when the angle at which the sheeting is viewed changes.

18. The sheeting of claim 1, wherein the color of the composite image changes relative to a viewing angle of less than one hundred fifty (150) degrees.

19. The sheeting of claim 1, wherein the sheeting comprises more than one composite image.

20. The sheeting of claim 1, wherein the composite image is a two-dimensional image.

21. The sheeting of claim 1, wherein the composite image is a three-dimensional image.

22. The sheeting of claim 1 further comprising a second donor material adjacent the material layer, wherein the second donor material forms individual, partially complete images on the sheeting associated with each of a plurality of the microlenses.

23. The sheeting of claim 22, wherein the second donor material comprises a colorant different from the colorant of the first donor material.

24. The sheeting of claim 22, wherein at least a portion of the composite image exhibits colors similar to the colorants in the first donor material and the second donor material.

25. The sheeting of claim 22, wherein at least a portion of the composite image exhibits a color similar to a mixture of the colorants in the first donor material and the second donor material.

26. The sheeting of claim 1, wherein the first donor material comprises a colorant and provides a first composite image, and wherein the second donor material provides a second composite image that fluoresces and/or phosphoresces.

27. The sheeting of claim 1 further comprising an adhesive layer for applying the sheeting to a substrate.

28. The sheeting of claim 27, wherein the sheeting is adhered to a substrate.

29. The article of claim 28, wherein the substrate is a document, a sign, an identification card, a container, a display, a credit card, or wherein the sheeting is used for advertising, decoration, authentication or identification purposes.

30. The sheeting of claim 1, wherein the sheeting includes a window without the presence of microlenses.

* * * * *

UNITED STATES PATENT AND TRADEMARK OFFICE
CERTIFICATE OF CORRECTION

| | | |
|---|---|---|
| PATENT NO. | : 7,981,499 B2 | |
| APPLICATION NO. | : 11/248950 | |
| DATED | : July 19, 2011 | |
| INVENTOR(S) | : James P. Endle et al. | |

It is certified that error appears in the above-identified patent and that said Letters Patent is hereby corrected as shown below:

Page 2

Column 2 (Other Publications); Line 9, Delete "Photgraphing" and insert -- Photographing --, therefor.

Column 2 (Other Publications); Line 9, Delete "Photograpy" and insert -- Photography --, therefor.

Column 17

Line 4, Delete "105b," and insert -- 105b --, therefor.

Column 18

Line 46, Delete "Cartesian" and insert -- cartesian --, therefor.

Column 19

Line 38, Delete "terathalate" and insert -- terephthalate --, therefor.

Signed and Sealed this
Twenty-first Day of February, 2012

David J. Kappos
*Director of the United States Patent and Trademark Office*